(12) United States Patent
     Takaoka

(10) Patent No.: US 11,899,461 B2
(45) Date of Patent: Feb. 13, 2024

(54) SYSTEM AND METHOD FOR AUTOMATICALLY CONTROLLING WORK MACHINE INCLUDING WORK IMPLEMENT

(71) Applicant: KOMATSU LTD., Tokyo (JP)

(72) Inventor: Yukihisa Takaoka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 559 days.

(21) Appl. No.: 17/273,387

(22) PCT Filed: Sep. 17, 2019

(86) PCT No.: PCT/JP2019/036376
    § 371 (c)(1),
    (2) Date: Mar. 4, 2021

(87) PCT Pub. No.: WO2020/105261
    PCT Pub. Date: May 28, 2020

(65) Prior Publication Data
    US 2021/0216075 A1    Jul. 15, 2021

(30) Foreign Application Priority Data

Nov. 19, 2018  (JP) ................................ 2018-216703

(51) Int. Cl.
    *G05D 1/02*    (2020.01)
    *E02F 3/84*    (2006.01)
    (Continued)

(52) U.S. Cl.
    CPC ........... *G05D 1/0212* (2013.01); *E02F 3/841* (2013.01); *E02F 3/844* (2013.01); *E02F 9/265* (2013.01);
    (Continued)

(58) Field of Classification Search
    CPC .............. G05D 1/0212; G05D 1/0094; G05D 2201/0202; E02F 3/841; E02F 3/844; E02F 9/265; E02F 3/7618
    See application file for complete search history.

(56) References Cited

U.S. PATENT DOCUMENTS 9,014,925 B2    4/2015  Clar et al.
2013/0081831 A1 4/2013  Hayashi
                (Continued)

FOREIGN PATENT DOCUMENTS

AU    2017272278 A1    10/2018
JP       5247939 B1     4/2013
                (Continued)

OTHER PUBLICATIONS

The Office Action for the corresponding Canadian application No. 3,111,807, dated May 20, 2022.
(Continued)

*Primary Examiner* — Mathew Franklin Gordon
(74) *Attorney, Agent, or Firm* — Global IP Counselors, LLP

(57) ABSTRACT

A system automatically controls a work machine including a work implement. The system includes a load sensor and a processor. The load sensor detects load data indicative of a load applied to the work implement. The processor acquires the load data. The processor executes a load reduction control in order to cause the work machine to operate so as to reduce the load based on the load applied to the work implement during digging. The processor records, as a reference position, a position of the work machine when the load applied to the work implement during the digging becomes a predetermined threshold or greater. The processor determines a next starting position based on the refer- (Continued)

ence position. The processor controls the work machine to start next digging from the next starting position.

18 Claims, 18 Drawing Sheets

(51) Int. Cl.
  *E02F 9/26* (2006.01)
  *G05D 1/00* (2006.01)
  *E02F 3/76* (2006.01)
(52) U.S. Cl.
  CPC .......... *G05D 1/0094* (2013.01); *E02F 3/7618* (2013.01); *G05D 2201/0202* (2013.01)

(56) References Cited

U.S. PATENT DOCUMENTS

| | | | |
|---|---|---|---|
| 2015/0019086 A1 | 1/2015 | Hayashi et al. | |
| 2016/0076223 A1 | 3/2016 | Wei et al. | |
| 2016/0076224 A1 | 3/2016 | Edara et al. | |
| 2017/0009426 A1 | 1/2017 | Wei et al. | |
| 2018/0038067 A1 | 2/2018 | Hashimoto et al. | |

FOREIGN PATENT DOCUMENTS

| | | |
|---|---|---|
| JP | 5285805 B1 | 9/2013 |
| JP | 2018-21344 A | 2/2018 |
| WO | 2016/204660 A1 | 12/2016 |

OTHER PUBLICATIONS

L. Stewart, "Maximize Dozer Operations.", made public on Sep. 28, 2010, URL: <https://www.constructionequipment.com/doze-more-dirt>.

Examination report No. 1 for the corresponding Australian application No. 2019382333, dated Oct. 13, 2021.

The International Search Report for the corresponding international application No. PCT/JP2019/036376, dated Dec. 10, 2019.

SYSTEM AND METHOD FOR AUTOMATICALLY CONTROLLING WORK MACHINE INCLUDING WORK IMPLEMENT

CROSS-REFERENCE TO RELATED APPLICATIONS

This application is a U.S. National stage application of International Application No. PCT/JP2019/036376, filed on Sep. 17, 2019. This U.S. National stage application claims priority under 35 U.S.C. § 119(a) to Japanese Patent Application No. 2018-216703, filed in Japan on Nov. 19, 2018, the entire contents of which are hereby incorporated herein by reference.

BACKGROUND

Field of the Invention

The present invention relates to a system and a method for controlling a work machine including a work implement.

Background Information

Conventionally, an automatic control for a work machine has been proposed in a work machine such as a bulldozer. For example, Japanese Patent Publication No. 5247939 discloses a construction machine that performs digging automatically in accordance with a load applied to the blade. Specifically, a controller of the construction machine automatically adjusts the position of the blade so that the load applied to the blade matches a target load.

SUMMARY

In the aforementioned work machine, the controller causes the work implement to operate so as to reduce the load when the load applied to the work implement becomes excessive. For example, the controller reduces the load to be applied to the blade by raising the blade. When the load is reduced, the controller then lowers the blade and the digging continues.

In the aforementioned work machine, the controller causes the work implement to operate in a locus different from the normal locus when the load applied to the work implement is excessive. As a result, the shape of the dug actual topography is disturbed. Therefore, it is difficult to perform digging with a high quality finish.

An object of the present invention is to perform digging with a high quality finish by means of an automatic control of a work machine.

A system according to a first aspect is a system for automatically controlling a work machine including a work implement. The system includes a load sensor and a processor. The load sensor detects load data indicative of a load applied to the work implement. The processor acquires the load data. The processor executes a load reduction control to cause the work machine to operate so as to reduce the load based on the load applied to the work implement during digging. The processor records, as a reference position, the position of the work machine when the load applied to the work implement during digging becomes a predetermined threshold or greater. The processor determines the next starting position based on the reference position. The processor controls the work machine so as to start the next digging from the next starting position.

A method according to a second aspect is a method executed by a processor for automatically controlling a work machine including a work implement. The method includes the following processes. A first process is acquiring load data indicative of a load applied to the work implement. A second process is executing a load reduction control to cause the work machine to operate so as to reduce the load based on the load applied to the work implement during digging. A third process is recording, as a reference position, the position of the work machine when the load applied to the work implement during digging becomes a predetermined threshold or greater. A fourth process is determining the next starting position based on the position of the reference position. A fifth process is controlling the work machine so as to start the next digging from the next starting position.

In the present invention, the processor executes the load reduction control when the load applied to the work implement during digging becomes excessive. Consequently, the load applied to the work implement is reduced. In addition, the processor records, as the reference position, the position of the work machine when the load applied to the work implement during digging becomes a predetermined threshold or greater, and determines the next starting position based on the reference position and starts the next digging from the next starting position. As a result, digging with a high quality finish can be performed with the automatic control of the work machine even when the load reduction control is performed.

DETAILED DESCRIPTION OF EMBODIMENT(S)

Figure 1:
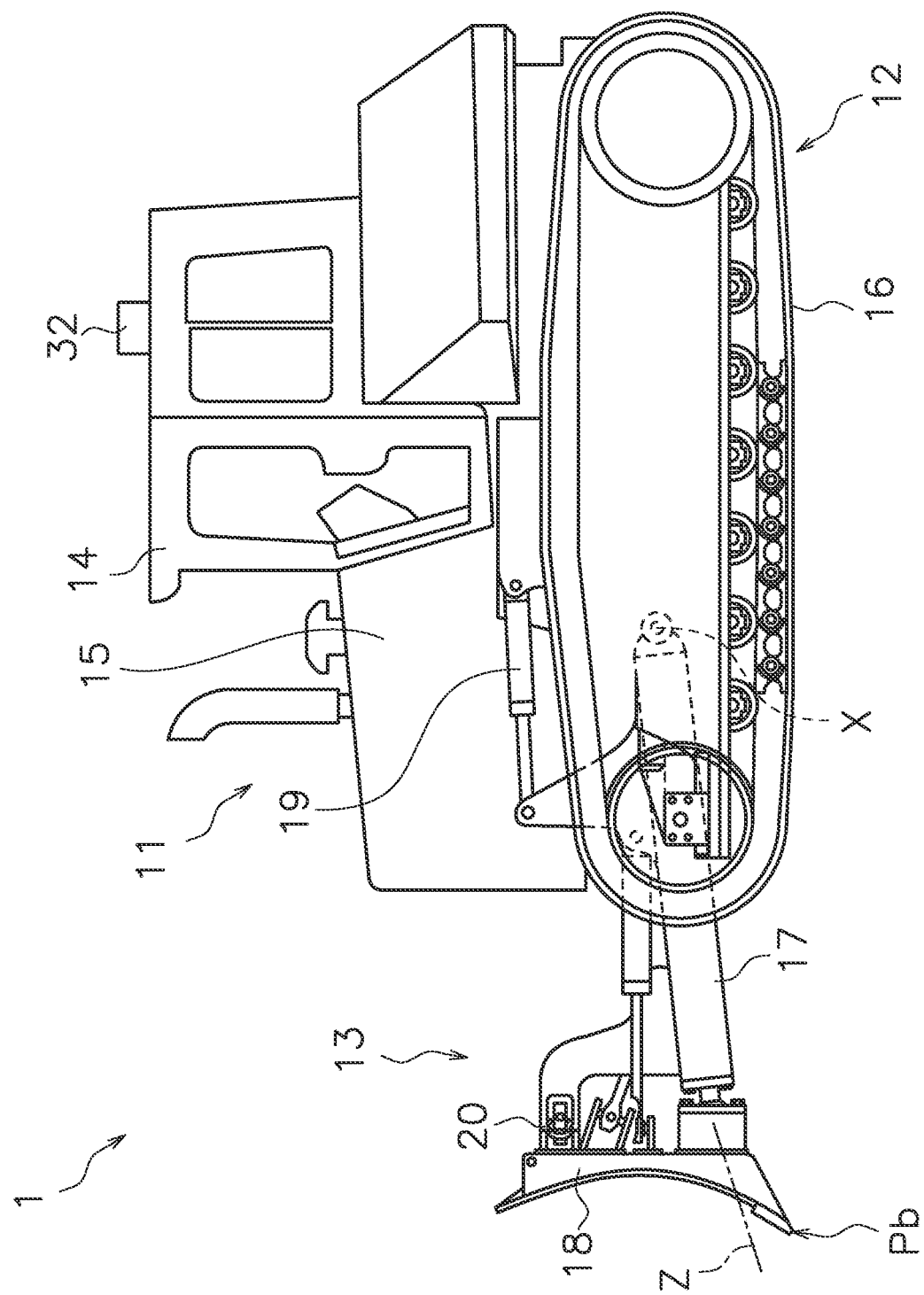
FIG. 1 is a side view of a work machine according to an embodiment.

A work machine according to an embodiment is discussed hereinbelow with reference to the drawings. FIG. 1 is a side view of a work machine 1 according to the embodiment. The work machine 1 according to the present embodiment is a bulldozer. The work machine 1 includes a vehicle body 11, a travel device 12, and a work implement 13.

The vehicle body 11 has an operator's cab 14 and an engine compartment 15. An operator's seat that is not illustrated is disposed inside the operator's cab 14. The engine compartment 15 is disposed in front of the operator's cab 14. The travel device 12 is attached to a bottom portion of the vehicle body 11. The travel device 12 includes a left and right pair of crawler belts 16. Only the crawler belt 16 on the left side is illustrated in FIG. 1. The work machine 1 travels due to the rotation of the crawler belts 16.

The work implement 13 is attached to the vehicle body 11. The work implement 13 has a lift frame 17, a blade 18, a lift cylinder 19, and a tilt cylinder 20. The lift frame 17 is attached to the vehicle body 11 in a manner that allows movement up and down centered on an axis X that extends in the vehicle width direction. The lift frame 17 supports the blade 18.

The blade 18 is disposed in front of the vehicle body 11. The blade 18 moves up and down accompanying the up and down movements of the lift frame 17. The lift frame 17 may be attached to the travel device 12. The lift cylinder 19 is coupled to the vehicle body 11 and the lift frame 17. Due to the extension and contraction of the lift cylinder 19, the lift frame 17 rotates up and down centered on the axis X.

The tilt cylinder 20 is coupled to the lift frame 17 and the blade 18. Due to the extension and contraction of the tilt cylinder 20, the blade 18 rotates around an axis Z that extends in roughly the front-back direction of the work machine 1.

Figure 2:
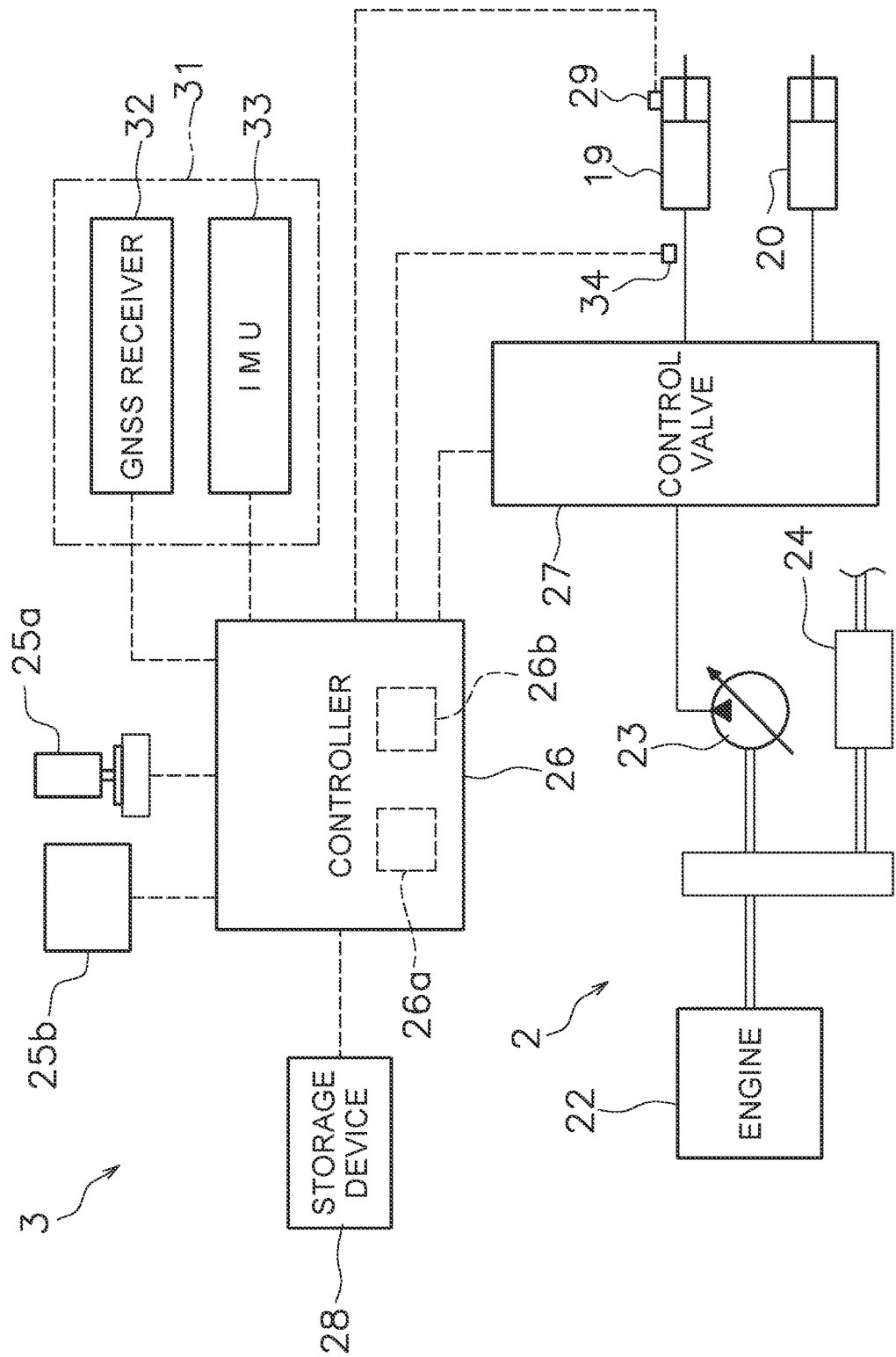
FIG. 2 is a block diagram illustrating a configuration of a drive system and a control system of the work machine.

FIG. 2 is a block diagram illustrating a configuration of a drive system 2 and a control system 3 of the work machine 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19 and the tilt cylinder 20. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydrostatic transmission (HST), for example. Alternatively, the power transmission device 24, for example, may be a transmission having a torque converter or a plurality of speed change gears.

The control system 3 includes an operating device 25a, an input device 25b, a controller 26, a storage device 28, and a control valve 27. The operating device 25a and the input device 25b are disposed in the operator's cab 14. The operating device 25a is a device for operating the work implement 13, the travel device 12, the engine 22, and the power transmission device 24. The operating device 25a is disposed in the operator's cab 14.

The operating device 25a receives operations from the operator for driving the work implement 13 and outputs operation signals corresponding to the operations. The operating device 25a receives operations from the operator for causing the work machine 1 to travel, and outputs operation signals corresponding to the operations. The operation signals of the operating device 25a are output to the controller 26. The operating device 25a includes, for example, an operating lever, a pedal, and a switch and the like.

The input device 25b is a device for performing below mentioned automatic control settings of the work machine 1. The input device 25b receives operations by the operator and outputs operation signals corresponding to the operations. The operation signals of the input device 25b are output to the controller 26. The input device 25b includes, for example, a touch screen. However, the input device 25b is not limited to a touch screen and may include hardware keys.

The controller 26 is programmed so as to control the work machine 1 based on acquired data. The controller 26 includes, for example, a processor 26a such as a CPU, and a memory 26b. The memory 26b may include a volatile memory such as a RAM or the like, or a non-volatile memory such as a ROM or the like. The controller 26 acquires operation signals from the operating device 25a and the input device 25b. The controller 26 causes the work machine 1 to travel by controlling the travel device 12, the engine 22, and the power transmission device 24 in accordance with the operation signals. The controller 26 causes the work implement 13 to operate by controlling the control valve 27 in accordance with the operation signals.

The control valve 27 is a proportional control valve and is controlled with command signals from the controller 26. The control valve 27 is disposed between the hydraulic pump 23 and hydraulic actuators such as the lift cylinder 19 and the tilt cylinder 20. The control valve 27 controls the flow rate of the hydraulic fluid supplied from the hydraulic pump 23 to the lift cylinder 19 or the tilt cylinder 20. The controller 26 generates a command signal for the control valve 27 so as to cause the lift cylinder 19 or the tilt cylinder 20 to contract and expand. As a result, the motions of the blade 18 are controlled. The control valve 27 may also be a pressure proportional control valve. Alternatively, the control valve 27 may be an electromagnetic proportional control valve.

The control system 3 includes a work implement sensor 29. The work implement sensor 29 detects the position of the work implement 13 with respect to the vehicle body 11 and outputs work implement position data indicative of the position of the work implement 13. The work implement sensor 29 may be a displacement sensor that detects displacement of the work implement 13.

For example, the work implement sensor 29 may include a sensor for detecting the stroke length of the lift cylinder 19. The controller 26 may calculate the lift angle of the blade 18 based on the stroke length of the lift cylinder 19. The work implement sensor 29 may include a sensor for detecting the stroke length of the tilt cylinder 20. The controller 26 may calculate the tilt angle of the blade 18 based on the stroke length of the tilt cylinder 20.

The control system 3 includes a load sensor 34. The load sensor 34 detects the load applied to the work implement 13 and generates load data indicative of the load. The load sensor 34 is, for example, a pressure sensor for detecting the hydraulic pressure of the lift cylinder 19. However, the load sensor 34 may be a sensor for detecting a parameter other than the hydraulic pressure of the lift cylinder 19. For example, the load sensor 34 may be a sensor for detecting the tractive force of the work machine 1. Alternatively, the load sensor 34 may be a sensor for detecting the amount of slippage of the travel device 12.

As illustrated in FIG. 2, the control system 3 includes a positional sensor 31. The positional sensor 31 measures the position of the work machine 1. The positional sensor 31 includes a global navigation satellite system (GNSS) receiver 32 and an inertial measurement unit (IMU) 33. The GNSS receiver 32 is, for example, a receiving apparatus for a global positioning system (GPS). For example, an antenna of the GNSS receiver 32 is disposed on the operator's cab 14. However, the antenna of the GNSS receiver 32 may be disposed in another position.

The GNSS receiver 32 receives a positioning signal from a satellite, computes the position of the antenna from the positioning signal, and generates machine position data indicative of the position of the vehicle body 11. The controller 26 acquires the machine position data from the GNSS receiver 32. The controller 26 acquires the current position of the work machine 1 and the traveling direction and the vehicle speed of the work machine 1 from the machine position data.

The IMU 33 acquires vehicle body inclination angle data. The vehicle body inclination angle data includes the angle (pitch angle) with respect to horizontal in the front-back direction of the work machine 1, and the angle (roll angle) with respect to horizontal in the transverse direction of the work machine 1. The controller 26 acquires the vehicle body inclination angle data from the IMU 33.

The controller 26 computes a blade tip position Pb of the blade 18 from the work implement position data, the machine position data, and the vehicle body inclination angle data. For example, the controller 26 acquires the global coordinates of the GNSS receiver 32 based on the machine position data. The controller 26 calculates the local coordinates of the blade tip position Pb with respect to the GNSS receiver 32 based on the work implement position data. The controller 26 calculates the global coordinates of the blade tip position Pb based on the global coordinates of the GNSS receiver 32, the local coordinates of the blade tip position Pb, and the vehicle body inclination angle data. The controller 26 acquires the global coordinates of the blade tip position Pb as the current position data of the work implement 13.

The storage device 28 may be a semiconductor memory or a hard disk and the like. The storage device 28 is an example of a non-transitory computer-readable recording medium. The storage device 28 records computer commands that are executable by the processor and that are for controlling the work machine 1.

Automatic control of the work machine 1 executed by the controller 26 will be explained next. The automatic control of the work machine 1 may be a semi-automatic control that is performed in accompaniment to manual operations by the operator. Alternatively, the automatic control of the work machine 1 may be a fully automatic control that is performed without manual operations by an operator.

Figure 3:
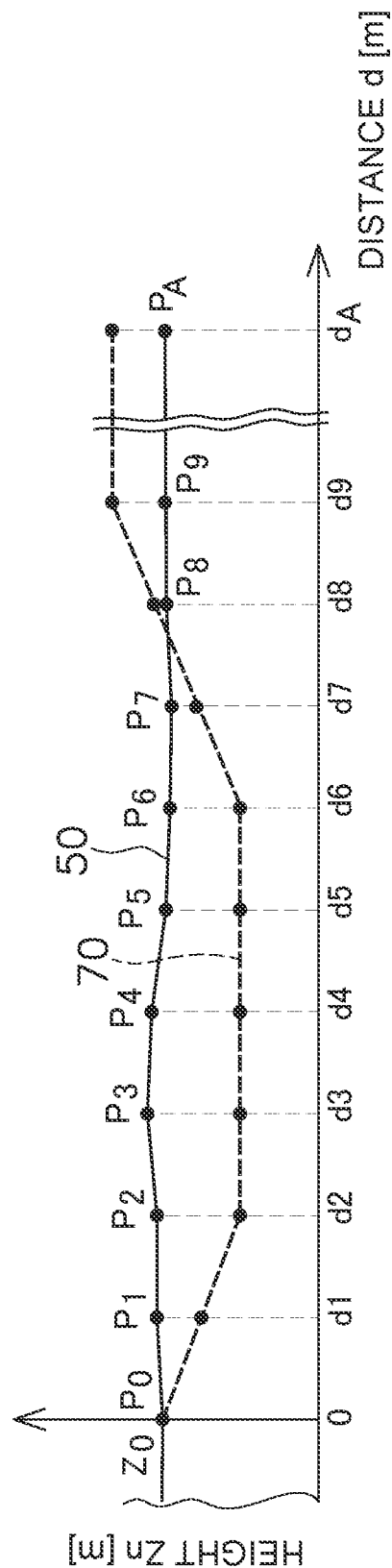
FIG. 3 is a cross-sectional view illustrating an example of an actual topography as seen from the vehicle width direction.

The controller 26 automatically controls the work machine 1 based on actual topography data, design topography data, and current position data. The actual topography data and the design topography data are stored in the storage device 28. The actual topography data indicates an actual topography 50 of the work site as illustrated in FIG. 3. The actual topography data is information indicative of the current topography of the work site located in the traveling direction of the work machine 1. FIG. 3 illustrates a cross-section of actual topography 50. In FIG. 3, the vertical axis indicates the height of the topography and the horizontal axis indicates the distance from the current position in the traveling direction of the work machine 1.

Specifically, the actual topography 50 is represented in the actual topography data by the height Zn of the actual topography 50 at a plurality of reference points Pn (n=1, 2, . . . , A) on the travel path of the work machine 1. The plurality of reference points Pn indicate a plurality of spots at predetermined intervals in the traveling direction of the work machine 1. The predetermined intervals may be, for example, 1 m. However, the predetermined intervals may be shorter than 1 m or longer than 1 m.

The actual topography data may be acquired by an external device and saved in the storage device 28. The actual topography data may be acquired by the controller 26 recording the locus of a portion of the work machine 1 such as the blade tip position Pb or the crawler belts 16, etc. Alternatively, the actual topography data may be acquired by carrying out distance surveying on the actual topography 50 with an on-board laser imaging detection and ranging (LIDAR) device.

The design topography data indicates a target design topography 70. The target design topography 70 represents a target locus of the blade tip of the blade 18 during the work. The target design topography 70 indicates the desired topography as a result of the work by the work implement 13. The target design topography 70 is represented by the height Zn of the target design topography 70 at the plurality of reference points Pn in the same way as the actual topography 50. The target design topography 70 may be generated by the controller 26 based on the actual topography data. Alternatively, the target design topography 70 may be generated by the controller 26 based on the capability of the work machine 1 such as the capacity of the blade 18. Alternatively, the target design topography 70 may be acquired by an external device.

Figure 4:
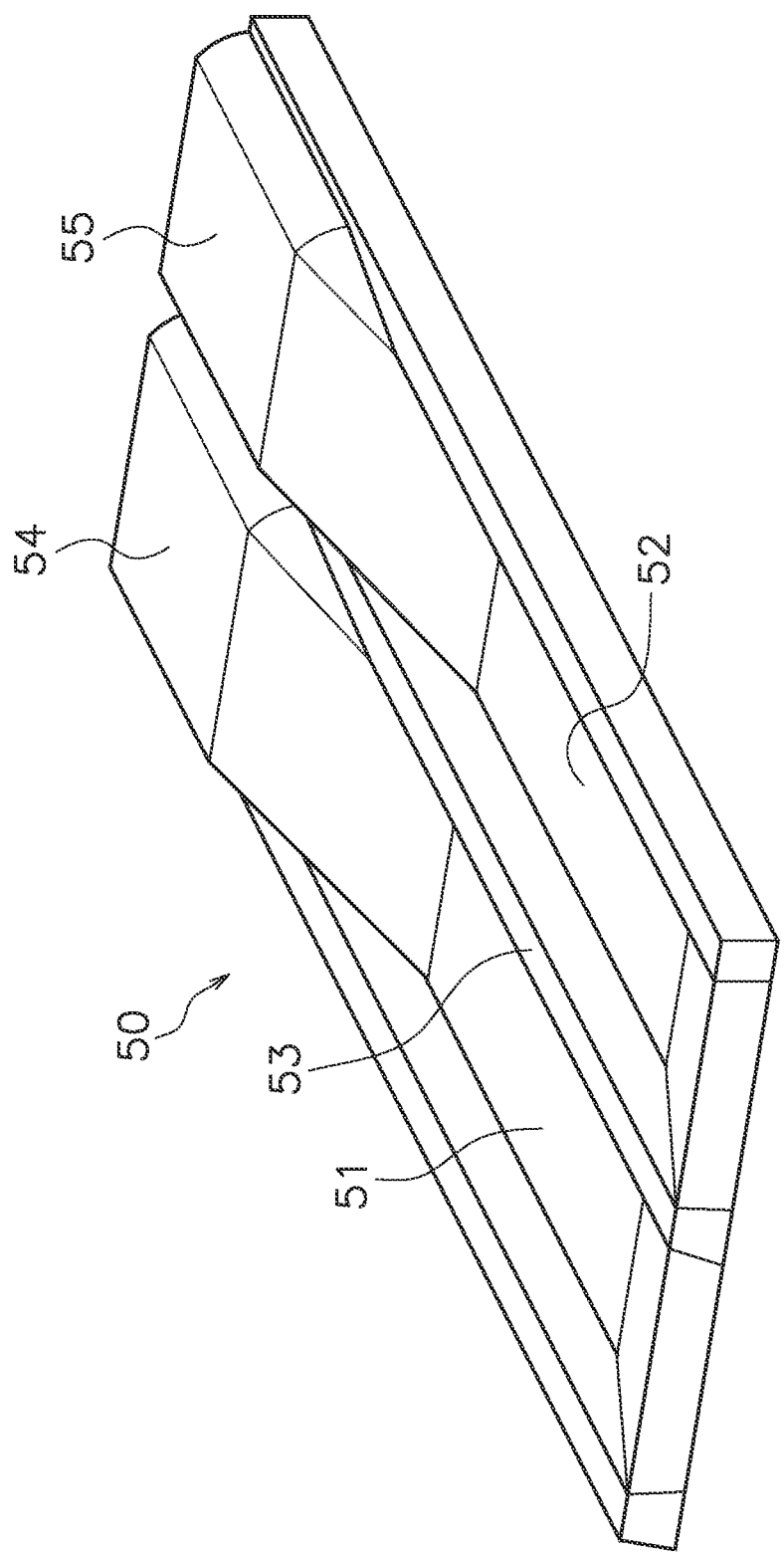
FIG. 4 is a perspective view illustrating an example of the actual topography in which slots and digging walls are formed.

The controller 26 selectively executes a normal digging mode and a wall digging mode. The normal digging mode is a control mode for digging the actual topography 50 as illustrated in FIG. 4. Slots 51 and 52 are formed in the actual topography 50 as a result of the normal digging mode. The wall digging mode is a control mode for digging a digging wall 53 formed between the plurality of slots 51 and 52. The controller 26 may also execute another control mode different from the normal digging mode and the wall digging mode.

Figure 5:
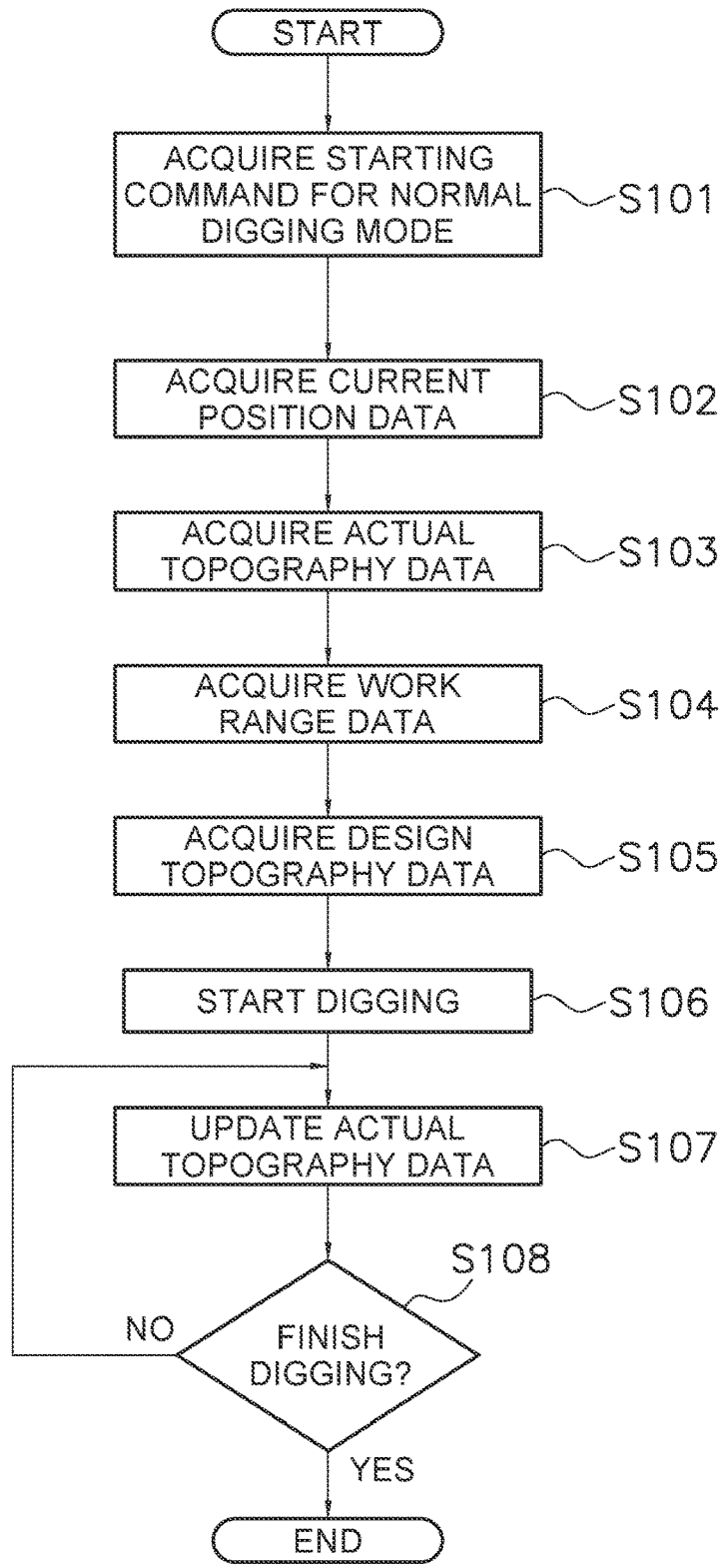
FIG. 5 is a flow chart illustrating processing of automatic control during a normal digging mode.

FIG. 5 is a flow chart illustrating processing of automatic control during the normal digging mode. As illustrated in FIG. 5, the controller 26 acquires a starting command for the normal digging mode in step S101. The normal digging mode may be selected by the operator operating the input device 25b. That is, the controller 26 may decide to execute the normal digging mode based on an operation signal from the input device 25b.

Alternatively, a previously set construction plan may be saved in the storage device 28 and the controller 26 may decide to execute the normal digging mode according to the construction plan. Alternatively, the controller 26 may decide to execute the normal digging mode by determining whether a predetermined starting condition has been satisfied based on a parameter such as the shape of the actual topography 50.

Figure 6:
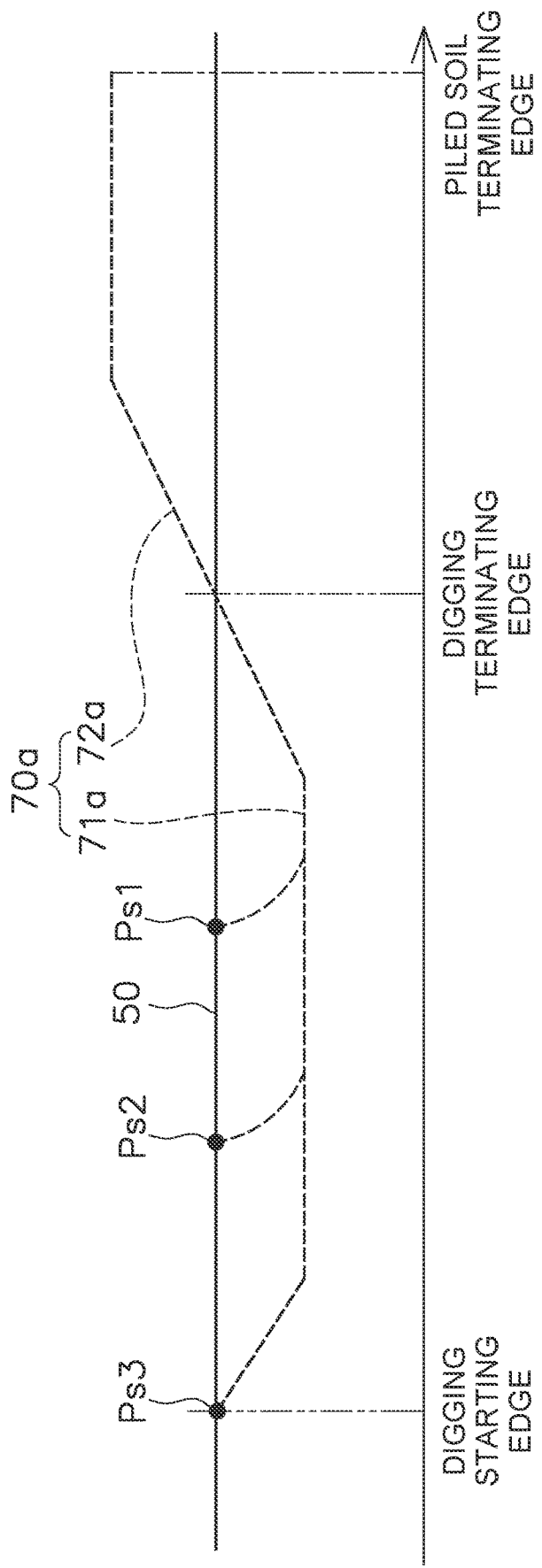
FIG. 6 is a cross-sectional view illustrating an example of an actual topography and a target design topography as seen from the vehicle width direction during the normal digging mode.

In step S102, the controller 26 acquires the abovementioned current position data. The controller 26 continuously acquires and updates the current position data during the execution of the following processes. In step S103, the controller 26 acquires the abovementioned actual topography data. FIG. 6 illustrates an example of the actual topography during the normal digging mode.

In step S104, the controller 26 acquires work range data. As illustrated in FIG. 6, the work range includes the starting edge and the terminating edge of the digging. The work range data includes starting edge position data and terminating edge position data of the digging. The starting edge position data of the digging indicates the digging starting edge. The terminating edge position data of the digging indicates the digging terminating edge.

The starting edge position and the terminating edge position of the digging may be set with the input device 25b. Alternatively, the starting edge position and the distance of a digging range of the digging may be set with the input device 25b, and the terminating edge position of the digging may be determined by computing. Alternatively, the terminating edge position and the distance of the digging range of the digging may be set with the input device and the starting edge position of the digging may be determined by computing.

In addition, the work range includes the terminating edge position of piled soil. The piled soil is a result of the work for discharging the soil dug and held by the blade 18 onto the actual topography 50. The work range data includes terminating edge position data of the piled soil. The terminating edge position data of the piled soil indicates the terminating edge position of the piled soil. The terminating edge position of the piled soil may be set with the input device 25b. Alternatively, the length of the piled soil range may be set with the input device 25b, and the terminating edge position of the piled soil may be determined by computing.

The controller 26 acquires the work range data based on operation signals from the input device 25b. However, the controller 26 may acquire the work range data with another method. For example, the controller 26 may acquire the work range data from an external device.

In step S105, the controller 26 acquires the design topography data. For example, the controller 26 determines a target design topography 70a as depicted in FIG. 6. The target design topography 70a includes a first target topography 71a and a second target topography 72a. At least a portion of the first target topography 71a is located lower than the actual topography 50. At least a portion of the second target topography 72a is located higher than the actual topography 50.

The controller 26 may determine the target design topography 70a in accordance with the actual topography 50. For example, the controller 26 may determine the first target topography 71a so that the first target topography 71a is located below the actual topography 50 by a predetermined distance. The controller 26 may determine the first target topography 71a so that the first target topography 71a is inclined at a predetermined angle to the actual topography 50 or to the horizontal direction.

The controller 26 may determine the second target topography 72a so that the second target topography 72a is located above the actual topography 50 by a predetermined distance. The controller 26 may determine the second target topography 72a so that the second target topography 72a is inclined at a predetermined angle to the actual topography 50 or to the horizontal direction. Alternatively, the target design topography 70a may be determined in advance.

In step S106, the controller 26 starts the digging. The controller 26 controls the work machine 1 in accordance with the target design topography 70a. The controller 26 causes the work machine 1 to travel forward from the starting edge to the terminating edge of the digging and controls the work implement 13 so that the blade tip position Pb of the blade 18 moves in accordance with the first target topography 71a. The actual topography 50 is dug due to the blade tip of the blade 18 moving along the first target topography 71a. Consequently, the slots 51 and 52 are formed in the actual topography 50 as illustrated in FIG. 4.

The controller 26 also causes the work machine 1 to travel forward from the digging terminating edge to the terminating edge of the piled soil and controls the work implement 13 so that the blade tip of the blade 18 moves in accordance with the second target topography 72a. The soil dug and held by the blade 18 is piled on the actual topography 50 due to the blade tip of the blade 18 moving along the second target topography 72. Consequently, piles of piled soil 54 and 55 are piled on the actual topography 50 as illustrated in FIG. 4.

As illustrated in FIG. 6, the controller 26 may set a plurality of digging starting positions Ps1 to Ps3 between the starting edge and the terminating edge of the digging. The controller 26 may execute the digging from the digging starting position Ps1 nearer to the terminating edge and thereafter execute the digging of the digging starting positions Ps2 and Ps3 in order.

For example, the controller 26 controls the work machine 1 so as to first perform the digging from the earliest starting position Ps1 to the digging terminating edge, and then perform the soil piling toward the terminating edge of the piled soil by crossing over the digging terminating edge. Next, the controller 26 causes the work machine 1 to travel in reverse to the second starting position Ps2. The controller 26 then controls the work machine 1 so as to start digging from the second starting position Ps2 and perform the digging and soil piling in the same way as explained above. Next, the controller 26 causes the work machine 1 to travel in reverse to the third starting position Ps3. The controller 26 then controls the work machine 1 so as to start digging from the third starting position Ps3 and perform the digging and soil piling in the same way as explained above.

In step S107, the controller 26 updates the actual topography data. The controller 26 updates the actual topography data with position data that represents the most recent locus of the blade tip position Pb. Alternatively, the controller 26 may calculate the position of the bottom surface of the crawler belts 16 and update the actual topography data with the position data that indicates the locus of the bottom surfaces of the crawler belts 16.

Alternatively, the actual topography data may be updated from survey data measured by a surveying device outside of the work machine 1. For example, aerial laser surveying may be used as the external surveying device. Alternatively, the actual topography 50 may be imaged by a camera and the work site topography data may be generated from image data captured by the camera. For example, aerial photography surveying performed with an unmanned aerial vehicle (UAV) may be used. The updating of the actual topography data may be performed at predetermined periods or at any time.

The work from the digging starting edge to the terminating edge of the piled soil is set as a one unit of work, and when one unit of work is completed, the controller 26 causes the work machine 1 to move to the side of the previously formed slot 51. The second slot 52 is then formed by executing the processing from steps S101 to S107 again.

For example, as illustrated in FIG. 4, after causing the work machine 1 to operate so as to form the first slot 51, the controller 26 causes the work machine 1 to move to the side and causes the work machine 1 to operate so as to form the second slot 52 laterally adjacent to the first slot 51. The controller 26 may start forming the second slot 52 after repeating a plurality of units of work to form the first slot 51.

In step S108, the controller 26 determines whether to finish the digging. For example, the controller 26 may decide to finish the digging in accordance with the operation of the input device 25*b*. Alternatively, the controller 26 may decide to finish the digging in accordance with a previously set construction plan. Alternatively, the controller 26 may decide to finish the digging by determining whether a predetermined finishing condition is satisfied.

When the forming of the first slot 51 is finished and the forming of the second slot 52 starts, the controller 26 causes the work machine 1 to move further to the side than the width of the blade 18. As a result, the digging wall 53 is formed between the first slot 51 and the second slot 52. The digging wall 53 is a berm of soil along the slots 51 and 52.

Figure 7:
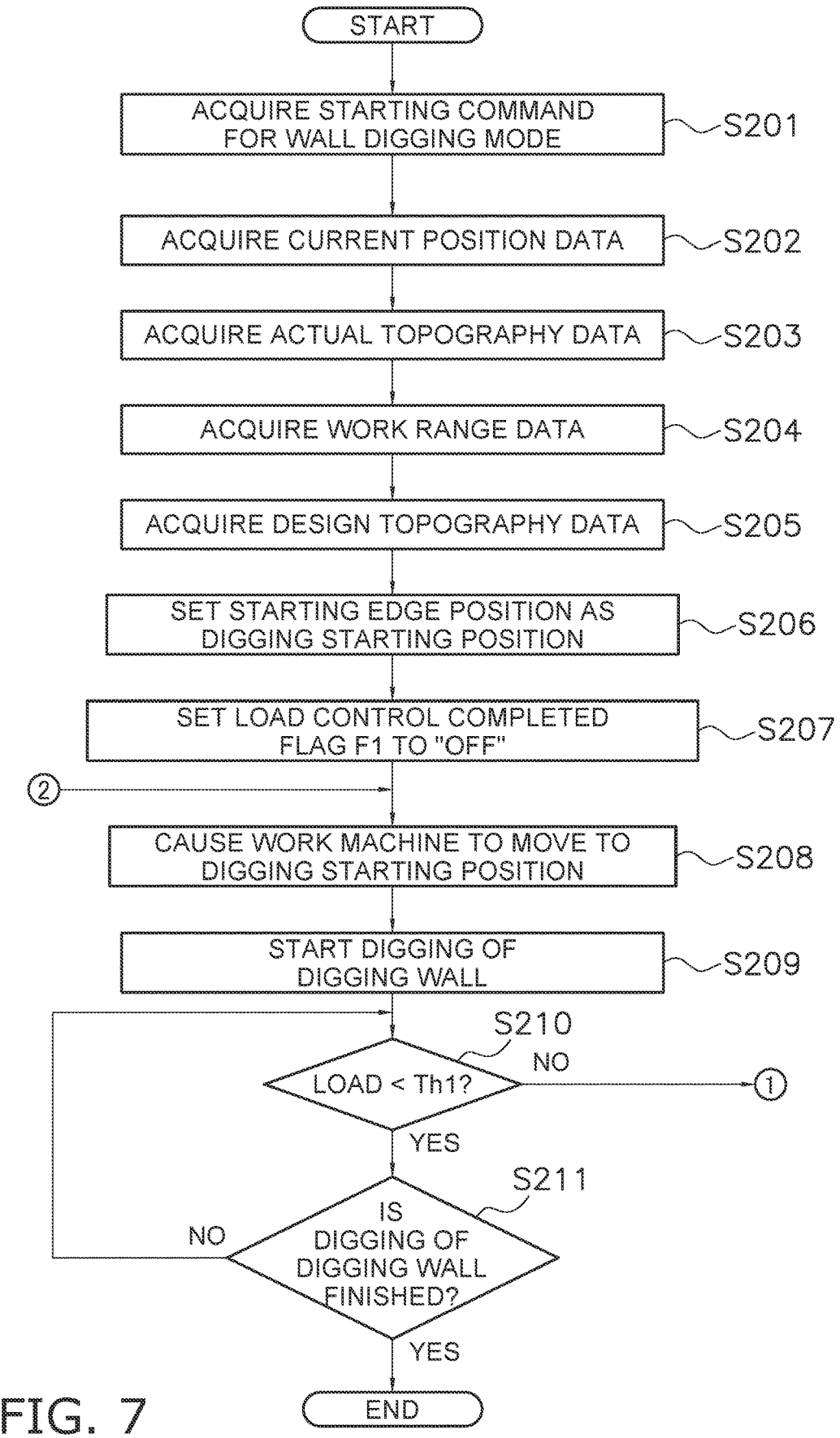
FIG. 7 is a flow chart illustrating processing of automatic control during a wall digging mode.

FIG. 7 is a flow chart illustrating processing of automatic control during the wall digging mode. In step S201, the controller 26 acquires a starting command for the wall digging mode. The wall digging mode may be selected by the operator operating the input device 25*b*. That is, the controller 26 may decide to execute the wall digging mode based on an operation signal from the input device 25*b*.

Alternatively, the controller 26 may decide to execute the wall digging mode in accordance with a previously set construction plan. Alternatively, the controller 26 may decide to execute the wall digging mode by determining whether a predetermined starting condition is satisfied.

Figure 8:
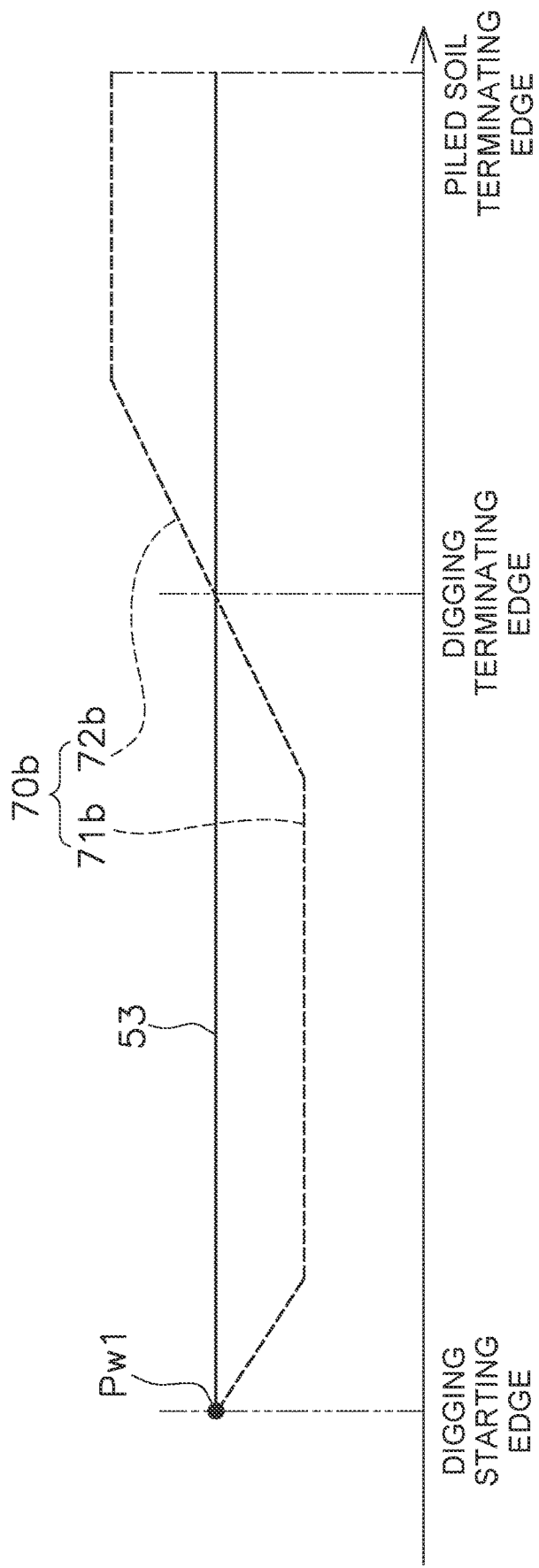
FIG. 8 is a cross-sectional view illustrating an example of an actual topography and a target design topography as seen from the vehicle width direction during the wall digging mode.
Figure 9:
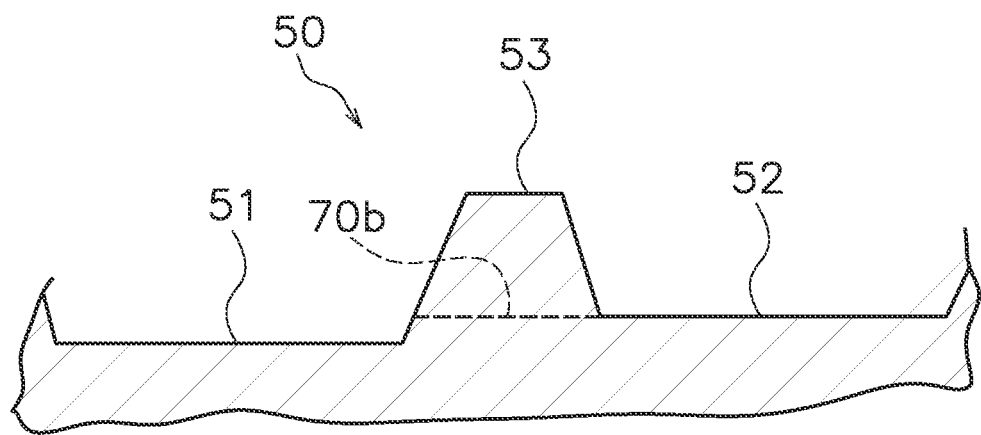
FIG. 9 is a cross-sectional view illustrating an example of the actual topography as seen from the traveling direction of the work machine.

In step S202, the controller 26 acquires the current position data in the same way as step S102. The controller 26 continuously acquires and updates the current position data during the execution of the following processes. In step S203, the controller 26 acquires the actual topography data. FIG. 8 illustrates an example of the digging wall 53 included in the actual topography 50 as seen from the vehicle width direction. FIG. 9 illustrates an example of the actual topography 50 as seen from the traveling direction of the work machine 1.

The actual topography data includes first slot position data, second slot position data, and digging wall position data. The first slot position data indicates the position of the first slot 51. The second slot position data indicates the position of the second slot 52. The digging wall position data indicates the position of the digging wall 53.

In step S204, the controller 26 acquires the work range data. As illustrated in FIG. 8, the work range includes the starting edge and the terminating edge of the digging. The work range data includes the starting edge position data and the terminating edge position data of the digging. The starting edge position data of the digging indicates the position of the digging starting edge. The terminating edge position data of the digging indicates the position of the digging terminating edge.

Figure 10:
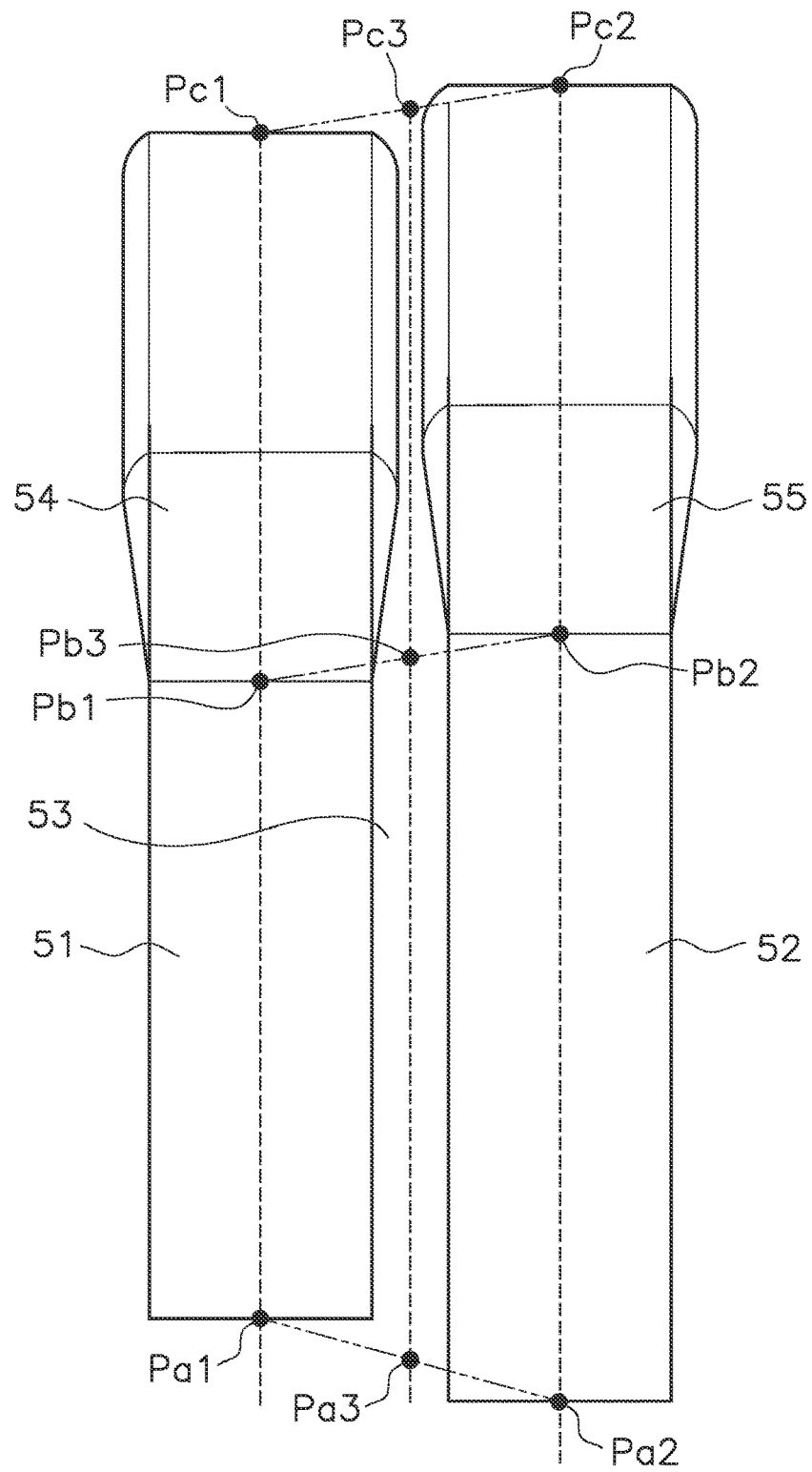
FIG. 10 illustrates a determination method of a work range during the wall digging mode.

FIG. 10 illustrates the actual topography 50 as seen from above. As illustrated in FIG. 10, the controller 26 determines a position Pa1 of the digging starting edge of the first slot 51, a position Pa2 of the digging starting edge of the second slot 52, and a position Pa3 of the digging starting edge of the digging wall 53. For example, the controller 26 calculates an intermediate position between the position Pa1 of the digging starting edge of the first slot 51 and the position Pa2 of the digging starting edge of the second slot 52. The controller 26 determines the calculated intermediate position as the position Pa3 of the digging starting edge of the digging wall 53. That is, the controller 26 determines the position of a center point of a line that joins the position Pa1 of the digging starting edge of the first slot 51 and the position Pa2 of the digging starting edge of the second slot 52, as the position Pa3 of the digging starting edge of the digging wall 53 as seen in a plan view.

The controller 26 determines a position Pb1 of the digging terminating edge of the first slot 51, a position Pb2 of the digging terminating edge of the second slot 52, and a position Pb3 of the digging terminating edge of the digging wall 53. For example, the controller 26 calculates an intermediate position between the position Pb1 of the digging terminating edge of the first slot 51 and the position Pb2 of the digging terminating edge of the second slot 52. The controller 26 determines the calculated intermediate position as the position Pb3 of the digging terminating edge of the digging wall 53. That is, the controller 26 determines the position of a center point of a line that joins the position Pb1 of the digging terminating edge of the first slot 51 and the position Pb2 of the digging terminating edge of the second slot 52, as the position Pb3 of the digging terminating edge of the digging wall 53 as seen in a plan view.

In addition, the work range includes the terminating edge of the piled soil as illustrated in FIG. 8. The work range data includes terminating edge position data of the piled soil. The terminating edge position data of the piled soil indicates the terminating edge position of the piled soil. As illustrated in FIG. 10, the controller 26 determines a position Pc1 of the terminating edge of the piled soil of the first slot 51, a position Pc2 of the terminating edge of the piled soil of the second slot 52, and a position Pc3 of the terminating edge of the piled soil of the digging wall 53. For example, the controller 26 calculates an intermediate position between the position Pc1 of the terminating edge of the piled soil of the first slot 51 and the position Pc2 of the terminating edge of the piled soil of the second slot 52. The controller 26 determines the calculated intermediate position as the position Pc3 of the terminating edge of the piled soil of the digging wall 53. That is, the controller 26 determines a position of a center point of a line that joins the position Pc1 of the terminating edge of the piled soil of the first slot 51 and the position Pc2 of the terminating edge of the piled soil of the second slot 52, as the position Pc3 of the terminating edge of the piled soil of the digging wall 53 as seen in a plan view.

In step S205, the controller 26 acquires the design topography data. For example, the controller 26 determines a target design topography 70*b* of the digging wall 53 as illustrated in FIG. 8. The target design topography 70*b* includes a first target topography 71*b* and a second target topography 72*b*. At least a portion of the first target topography 71*b* is positioned lower than the digging wall 53. At least a portion of the second target topography 72*b* is positioned higher than the digging wall 53. However, the second target topography 72*b* may be positioned lower than the digging wall 53 in the case of dropping the soil down a precipice and removing the soil.

The controller 26 determines a target digging height of the digging wall 53 from the height of the first slot 51 and the height of the second slot 52. The controller 26 determines the target design topography 70 from the target digging height. Specifically, as illustrated in FIG. 9, the controller 26 determines the target digging height of the digging wall 53 from the greater height of the first slot 51 and the second slot 52 (the height of the second slot 52 in FIG. 9). That is, the controller 26 determines the target digging height of the digging wall 53 to match the greater height among the heights of the first slot 51 and the second slot 52. The controller 26 then determines the target design topography 70b from the target digging height of the digging wall 53.

In step S206, the controller 26 sets the position Pa3 of the digging starting edge of the digging wall 53 acquired in step S204, as a digging starting position Pw1 as illustrated in FIG. 8. The controller 26 is not limited to using the position Pa3 of the digging starting edge of the digging wall 53, and may set another position determined based on the position Pa3 of the starting edge, as the digging starting position Pw1. For example, the controller 26 may set a position spaced away by a predetermined distance from the position Pa3 of the digging starting edge of the digging wall 53, as the digging starting position Pw1.

In step S207, the controller 26 sets a load control completed flag F1 to "OFF" The load control completed flag F1 is a flag indicative of whether the execution of the following load control is completed. The load control completed flag F1 being "OFF" indicates that the load control has not been executed yet. The load control completed flag F1 being "ON" indicates that the load control has already been executed.

Figure 11:
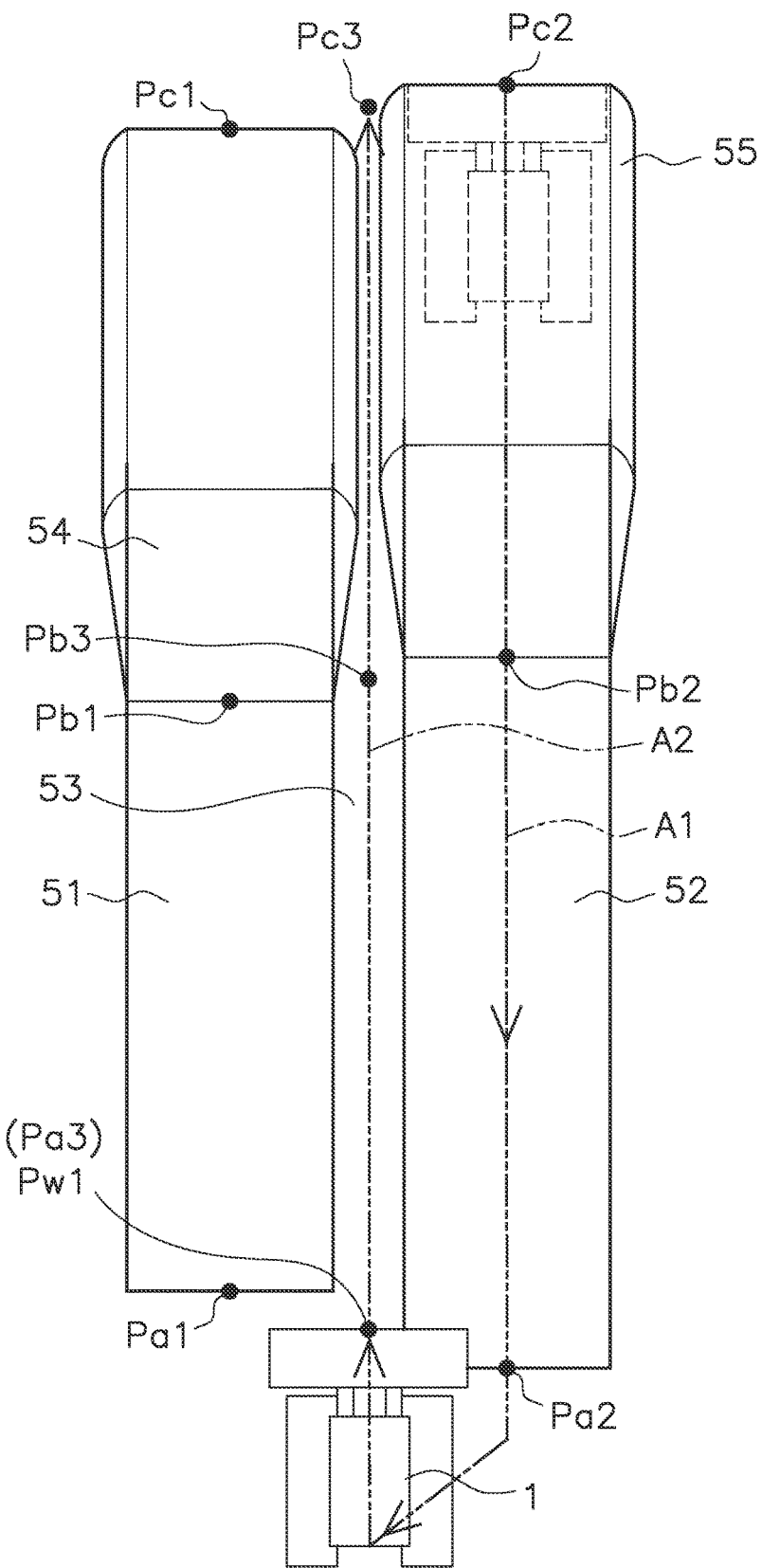
FIG. 11 illustrates motions of the work machine during the wall digging mode.

In step S208, the controller 26 causes the work machine 1 to move to the digging starting position Pw1. At this time, the controller 26 may cause the work machine 1 to move onto the digging wall 53 after traveling in reverse along the second slot 52 as illustrated by arrow A1 in FIG. 11. Alternatively, the controller 26 may cause the work machine 1 to move in reverse along the digging wall 53 after moving onto the digging wall 53.

In step S209, the controller 26 starts the digging of the digging wall 53. The controller 26 controls the work machine 1 in accordance with the target design topography 70b of the digging wall 53. Specifically, the controller 26 causes the work machine 1 to travel forward from the digging starting position Pw1 toward the position Pb3 of the digging terminating edge as indicated by arrow A2 in FIG. 11, and controls the work implement 13 so that the blade tip position of the blade 18 moves in accordance with the first target topography 71b. The digging wall 53 of the actual topography 50 is dug due to the blade tip of the blade 18 moving along the first target topography 71b.

The controller 26 also causes the work machine 1 to travel forward from the position Pb3 of the digging terminating edge to the position Pc3 of the terminating edge of the piled soil, and controls the work implement 13 so that the blade tip position of the blade 18 moves in accordance with second first target topography 72b. The soil dug and held by the blade 18 is piled on the actual topography 50 due to the blade tip of the blade 18 moving along the second target topography 72b. Consequently, as illustrated in FIG. 4, the gap between the piled soil 54 corresponding to the first slot 51 and the piled soil 55 corresponding to the second slot 52, is filled in with the dug soil.

In step S210, the controller 26 determines whether the load applied to the work implement 13 is less than a first threshold Th1. The first threshold Th1 is stored in the storage device 28. The first threshold Th1 may be a fixed value. Alternatively, the first threshold Th1 may be variable. The first threshold Th1 is preferably a value of a degree capable of preventing the work machine 1 or the work implement 13 from becoming inoperative. When the load applied to the work implement 13 is less than the first threshold Th1, the processing advances to step S211.

In step S211, the controller 26 determines whether the digging of the digging wall 53 is finished. For example, the controller 26 may decide to finish the digging of the digging wall 53 when the work machine 1 reaches the terminating edge of the piled soil. Alternatively, the controller 26 may decide to finish the digging in accordance with an operation of the input device 25b. Alternatively, the controller 26 may decide to finish the digging of the digging wall 53 in accordance with a previously set construction plan. Although not illustrated in the drawings, the controller 26 may also update the actual topography data in the same way as in step S107 in the wall digging mode.

Figure 12:
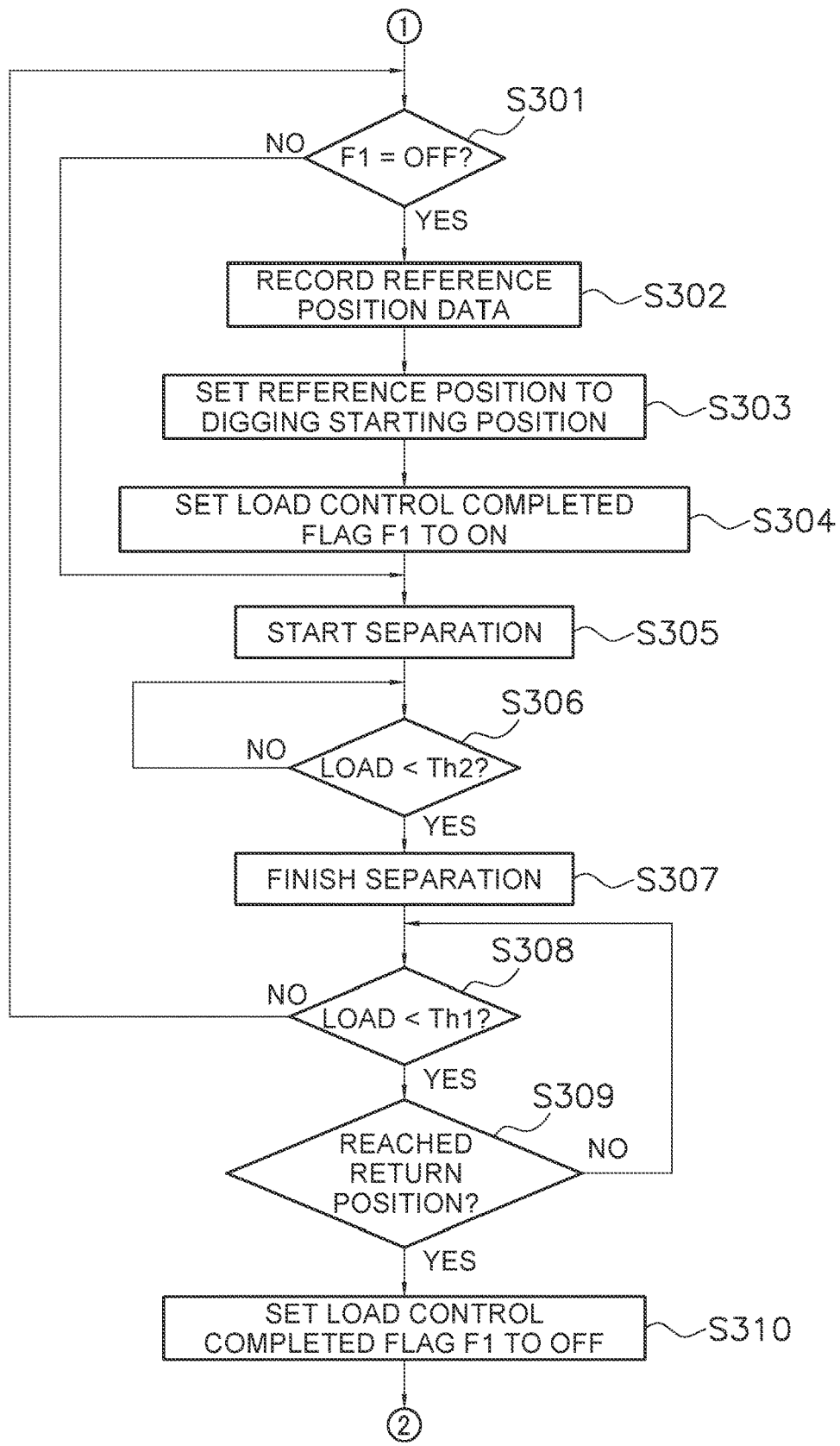
FIG. 12 is a flow chart of processing for load reduction control.

When the load applied to the work implement 13 is equal to or greater than the first threshold Th1 in step S210, the processing advances to step S301 in FIG. 12. FIG. 12 is a flow chart of processes for the load reduction control. The controller 26 executes the processes of the load reduction control illustrated in FIG. 12 when the load applied to the work implement 13 during digging is equal to or greater than the first threshold 1111. In the load reduction control, the controller 26 causes the work machine 1 to operate so as to reduce the load applied to the work implement 13. In the present embodiment, the controller 26 reduces the load applied to the work implement 13 by raising the work implement 13.

As illustrated in step S301 in FIG. 12, the controller 26 determines whether the load control completed flag F1 is "OFF." The processing advances to step S302 when the load control completed flag F1 is "OFF."

Figure 13:
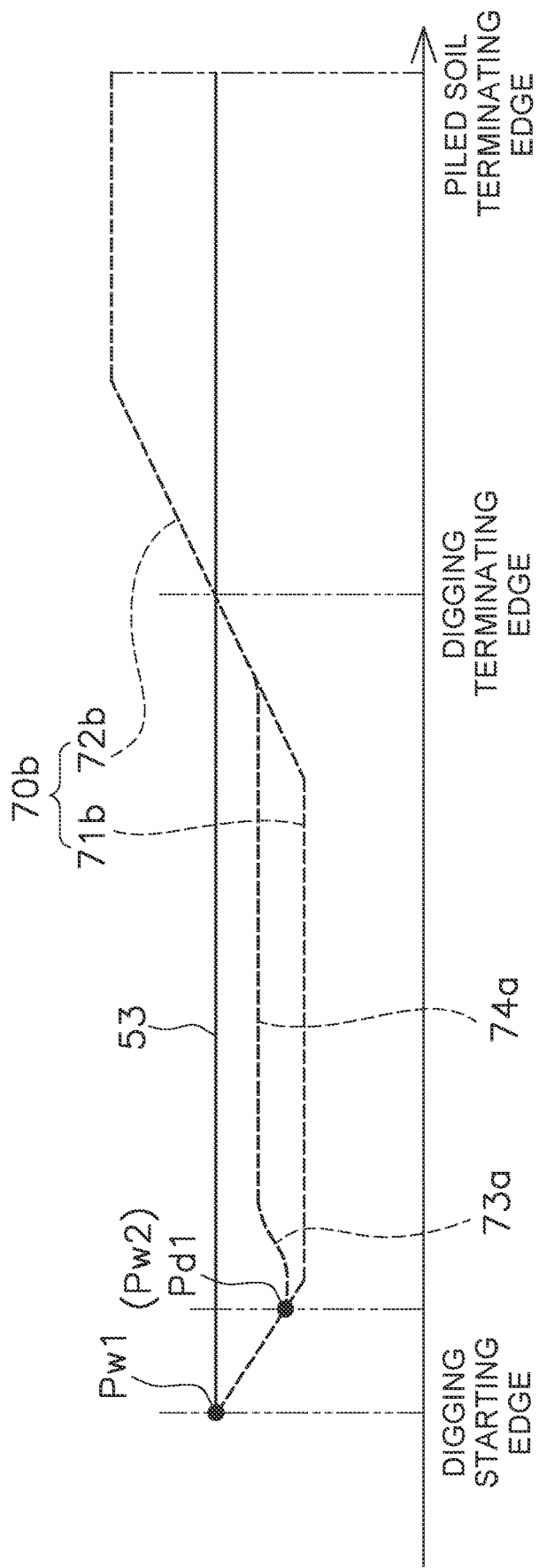
FIG. 13 illustrates a locus of the work implement under the load reduction control.

In step S302, the controller 26 records reference position data. In this case, the controller 25 records the position of the work machine 1 at the time that the execution of the load reduction control starts, as a reference position. For example, as illustrated in FIG. 13, the controller 26 records the position where the blade tip of the blade 18 has moved away from the target design topography 70b, as a reference position Pd1.

In step S303, the controller 26 sets the reference position Pd1 to the next digging starting position Pw2. The controller 26 is not limited to using the reference position Pd1, and may set another position determined as the next digging starting position Pw2. For example, the controller 26 may set a position spaced away by a predetermined distance from the reference position Pd1, as the next digging starting position Pw2.

In step S304, the controller 26 sets the load control completed flag F1 to "ON." In step S305, the controller 26 begins the separation from the target design topography 70b. In this case, the controller 26 raises the work implement 13 as indicated by the locus 73a in FIG. 13. That is, the controller 26 raises the blade tip of the blade 18. The controller 26 continues to cause the work machine 1 to move forward from step S305 to step S309.

In step S306, the controller 26 determines whether the load applied to the work implement 13 is less than a second threshold Th2. The second threshold Th2 is smaller than the first threshold 7111. That is, the second threshold Th2 is a value indicative of that the load applied to the work implement 13 has been reduced. As indicated by the locus 73a in FIG. 13, the controller 26 continues the separation until the load applied to the work implement 13 becomes less than the second threshold Th2. That is, the controller 26 continues to raise the work implement 13 until the load applied to the work implement 13 becomes less than the second threshold Th2. When the load applied to the work implement 13 becomes less than the second threshold Th2, the controller 26 finishes the separation in step S307.

In step S308, the controller 26 determines whether the load applied to the work implement 13 is less than the first threshold 7111. When the load applied to the work implement 13 is less than the first threshold 7111, the processing advances to step S309.

In step S309, the controller 26 determines whether the work machine 1 has reached a return position. The return position is the position, for example, where the work machine 1 crosses the digging terminating edge and has finished piling the soil held by the work implement 13 onto a location between the digging terminating edge and the piled soil terminating edge. The return position may be a position between the digging terminating edge and the piled soil terminating edge. The return position may be the position of the piled soil terminating edge. When the work machine 1 reaches the return position, the processing advances to step S310.

In step S310, the controller 26 sets the load control completed flag F1 to "OFF" The processing then returns to step S208. In step S208, the controller 26 causes the work machine 1 to move to the digging starting position Pw2. The digging starting position Pw2 is the abovementioned reference position Pd1. Therefore, the work machine 1 returns by traveling in reverse as far as the reference position Pd1.

In step S209, the controller 26 starts the digging of the digging wall 53 again. The controller 26 controls the work machine 1 so as to start the digging from the digging starting position Pw2, namely the reference position Pd1, and so that the work implement 13 moves in accordance with the target design topography 70b. When the controller 26 determines that the digging of the digging wall 53 is finished in step S211, the controller 26 finishes the processing of the wall digging mode.

For example, as illustrated in FIG. 13, the work machine 1 starts a first digging from the digging starting position Pw1 (referred to below as "first starting position Pw1"). When the load applied to the work implement 13 becomes the first threshold Th1 or greater during the first digging, the controller 26 starts the load reduction control and raises the work implement 13 as indicated by the locus 73a. The controller 25 also records the position of the work machine 1 at the time that the execution of the load reduction control starts, as the reference position Pd1.

When the load is reduced and becomes smaller than the second threshold Th2 due to the raising of the work implement 13, the controller 26 maintains the blade tip of the work implement 13 at the height at that time as indicated by the locus 74a and continues the digging. The blade tip of the work implement 13 merges with the target design topography 70b and reaches the digging terminating edge, whereby the digging is finished. The work machine 1 then moves further forward thereby performing the soil piling to finish the first digging.

When the first digging is finished, the controller 26 causes the work machine 1 to travel in reverse and move to the digging starting position Pw2 (referred to below as "second starting position Ps2"). The work machine 1 is controlled so as to start a second digging from the second starting position Ps2. The controller 26 causes the work implement 13 to operate in accordance with the target design surface 70b to perform the digging and the soil piling. When the controller 26 determines that the digging of the digging wall 53 is finished, the controller 26 finishes the processing of the wall digging mode.

However, when the load applied to the work implement 13 becomes the first threshold Th1 or greater again in the aforementioned step S308 during the first digging, the processing returns to step S301. Since the load control completed flag is "ON," the processing advances from step S301 to step S305. Therefore, the recording of the reference position in step S302 and the setting of the reference position to the digging starting position in step S303 are not performed and the processing advances to step S305.

In step S305, the controller 26 causes the work implement 13 to raise and start the separation. When the load applied to the work implement 13 becomes less than the second threshold Th2 (step S306), the controller 26 then finishes the separation in step S307 and continues the first digging.

Thereafter, when the load applied to the work implement 13 during the first digging becomes the first threshold Th1 or greater again, the recording of the reference position data in step S302 and the setting of the reference position to the digging starting position in step S303 are not performed, and the processes from step S305 to step S307 is repeated.

Figure 14:
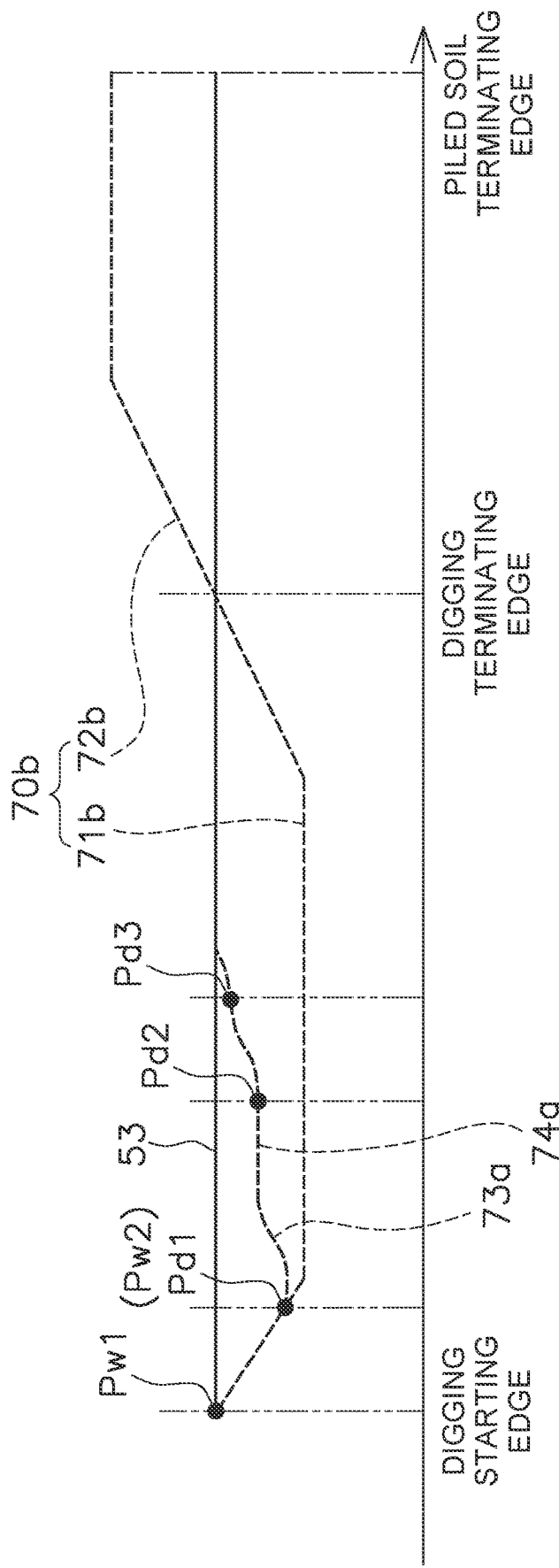
FIG. 14 illustrates a locus of the work implement under the load reduction control.

For example, as illustrated in FIG. 14, the load reduction control is started at a plurality of reference positions Pd1, Pd2 and Pd3 during the first digging. In this case, the earliest reference position Pd1 among the plurality of reference positions Pd1, Pd2 and Pd3 is recorded as the second starting position Ps2.

When the work machine 1 reaches the return position (S309), the controller 26 sets the load control completed flag F1 of "OFF" in step S310 and the processing returns to step S208.

At this time, the second starting position Ps2 is the reference position Pd1. As a result, in step S208, the controller 26 causes the work machine 1 to move to the reference position Pd1. The controller 26 then causes the work machine 1 to start the second digging from the reference position Pd1.

In the control system 3 of the work machine 1 according to the present embodiment explained so far, the controller 26 executes the load reduction control when the load applied to the work implement 13 during the first execution becomes excessive. Consequently, the load applied to the work implement 13 is reduced. In addition, when the load reduction control is executed, the controller 26 records, as the reference position Pd1, the position of the work machine 1 when the execution of the load reduction control was started, determines the second starting position Ps2 based on the reference position Pd1, and starts the second digging from the second starting position Ps2. As a result, digging with a high quality finish can be performed with the automatic control of the work machine 1 even when the load reduction control is performed.

The controller 26 determines the second starting position Ps2 based on the earliest reference position Pd1 among the plurality of reference positions Pd1 to Pd3 when the load reduction control is executed a plurality of times. As a result, the work can be performed more effectively in comparison to when the second digging is started from the second or subsequent reference positions Pd2 or Pd3.

Although an embodiment of the present invention has been described so far, the present invention is not limited to the above embodiment and various modifications may be made within the scope of the invention.

The work machine 1 is not limited to a bulldozer, and may be another type of machine such as a wheel loader, a motor grader, a hydraulic excavator, or the like. The work machine may be driven by an electric motor. The actual topography may include material such as rocks or iron ore or the like.

The work machine may be a vehicle that can be remotely operated. In this case, a portion of the control system may be disposed outside of the work machine. For example, the controller may be disposed outside the work machine. The controller may be disposed inside a control center separated from the work site. In this case, the work machine may not be provided with an operator's cab.

Figure 15:
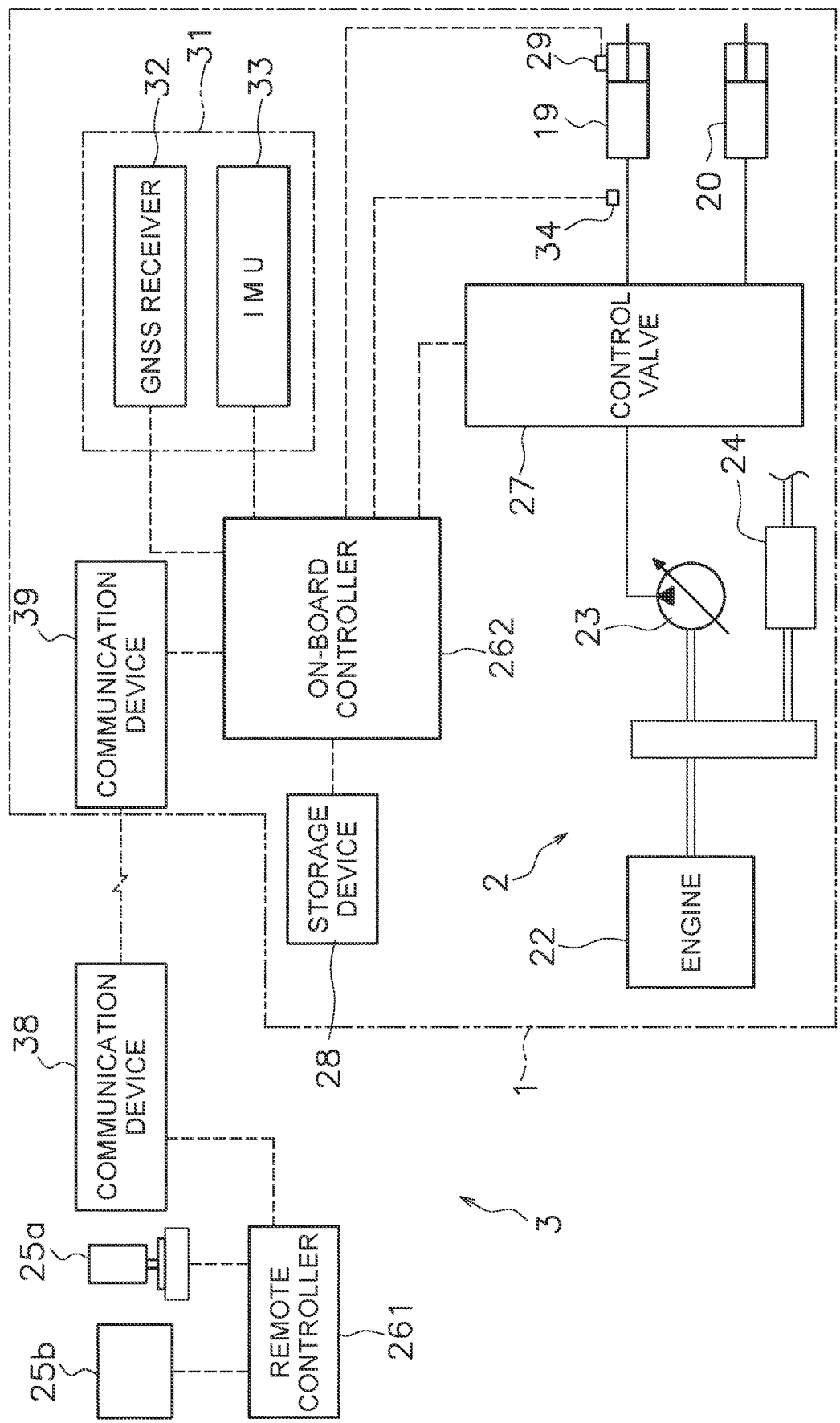
FIG. 15 is a block diagram of a configuration of a drive system and a control system of the work machine according to a first modified example.

The controller may have a plurality of controllers separated from each other. For example as illustrated in FIG. 15, the controller 26 may include a remote controller 261 disposed outside of the work machine and an on-board controller 262 mounted on the work machine. The remote controller 261 and the on-board controller 262 may be able to communicate wirelessly via communication devices 38 and 39. A portion of the abovementioned functions of the controller 26 may be executed by the remote controller 261, and the remaining functions may be executed by the on-board controller 262. For example, the processes for determining the target design topographies 70, 70a and 70b may be executed by the remote controller 261, and the processes for outputting the command signals to the travel device 12, the work implement 13, the engine 22, the power transmission device 24, etc. may be executed by the on-board controller 262.

The operating device 25a and the input device 25b may also be disposed outside of the work machine. In this case, the operator's cab may be omitted from the work machine. Alternatively, the operating device 25a and the input device 25b may be omitted from the work machine.

Figure 16:
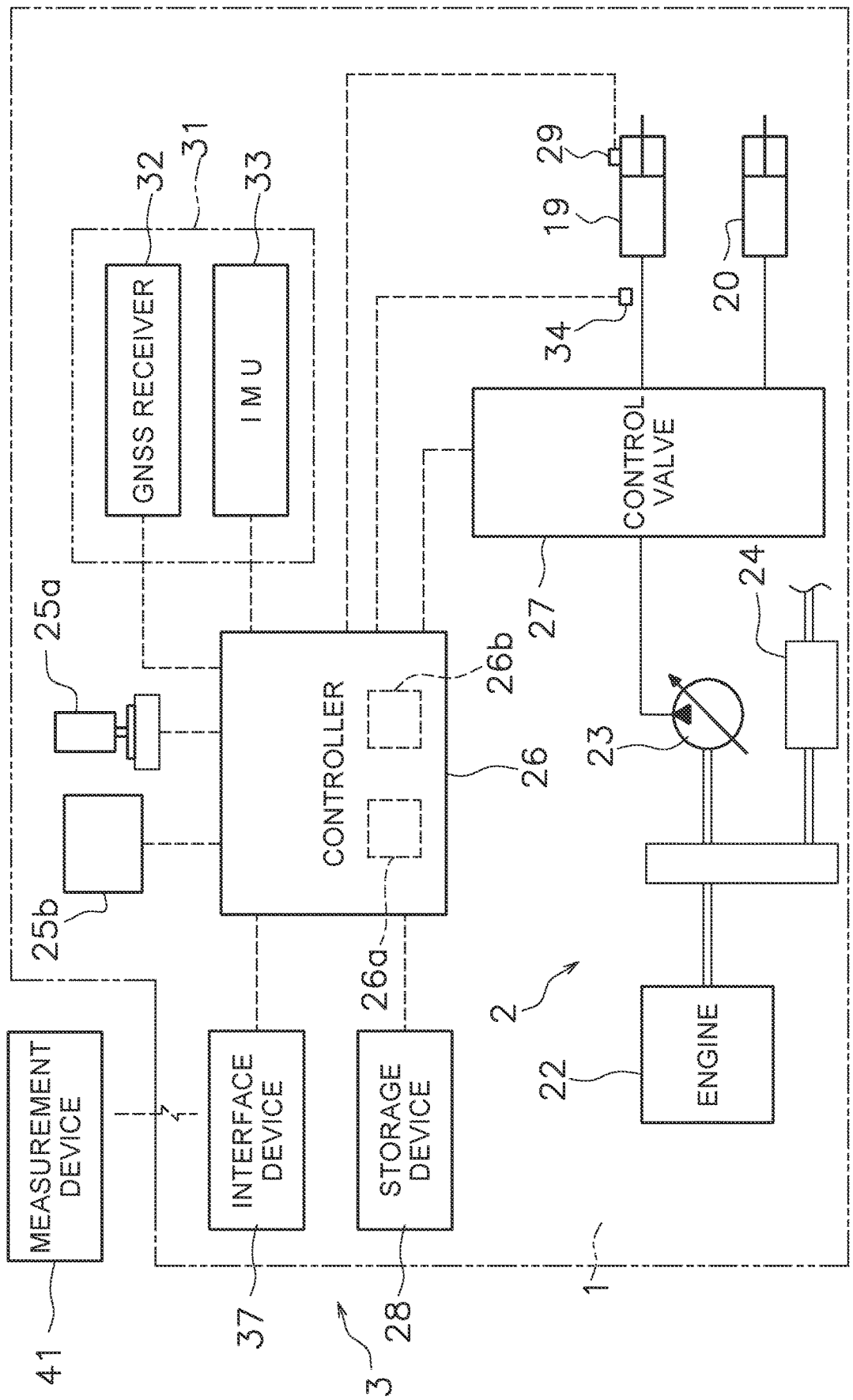
FIG. 16 is a block diagram of a configuration of a drive system and a control system of the work machine according to the first modified example.

The actual topography 50 may be acquired with another device and is not limited to being acquired with the abovementioned positional sensor 31. For example, as illustrated in FIG. 16, the topography 50 may be acquired with an interface device 37 that receives data from an external device. The interface device 37 may wirelessly receive the actual topography data measured by an external measurement device 41. Alternatively, the interface device 37 may be a recording medium reading device and may accept the actual topographical data measured by the external measurement device 41 via a recording medium.

The method for determining the target design topographies 70, 70a and 70b is not limited to the method of the above embodiment and may be modified. For example, the controller 26 may determine the target design topographies 70, 70a and 70b based on the load on the work implement 13, a target angle, a target position, or another parameter. Alternatively, the target design topographies 70, 70a and 70b may be determined in advance with a construction plan.

The work steps of the normal digging mode and the wall digging mode are not limited to those of the above embodiment. For example, the digging of the digging wall 53 between the two slots 51 and 52 is performed after the slots are formed in the above embodiment. However, the digging of a plurality of digging walls between three or more slots may be performed after the three or more slots are formed.

The work range data may be set by the operator operating the input device 25b in the wall digging mode. Alternatively, the controller 26 may determine either a position beside the digging starting edge of the first slot 51 or a position beside the digging starting edge of the second slot 52, as the position of the digging starting edge of the digging wall 53. The controller 26 may determine either a position beside the digging terminating edge of the first slot 51 or a position beside the digging terminating edge of the second slot 52, as the position of the digging terminating edge of the digging wall 53. The controller 26 may determine either a position beside the terminating edge of the piled soil of the first slot 51 or a position beside the terminating edge of the piled soil of the second slot 52, as the position of the terminating edge of the piled soil of the digging wall 53.

The controller 26 may determine the target digging height of the digging wall 53 from the lower height among the heights of the first slot 51 and the second slot 52. Alternatively, the controller 26 may determine the target digging height of the digging wall 53 from an intermediate value of the height of the first slot 51 and the height of the second slot 52.

The controller 26 in the above embodiment executes the load reduction control during the wall digging mode. However, the controller 26 may execute the load reduction control during a control mode other than the wall digging mode. For example, the controller 26 may execute the load reduction control during the normal digging mode.

The controller 26 may record, as the reference position Pd1, a position where the load applied to the work implement 13 becomes another threshold or greater different from the first threshold Th1. The other threshold may be a value smaller than the abovementioned first threshold Th1.

Figure 17:
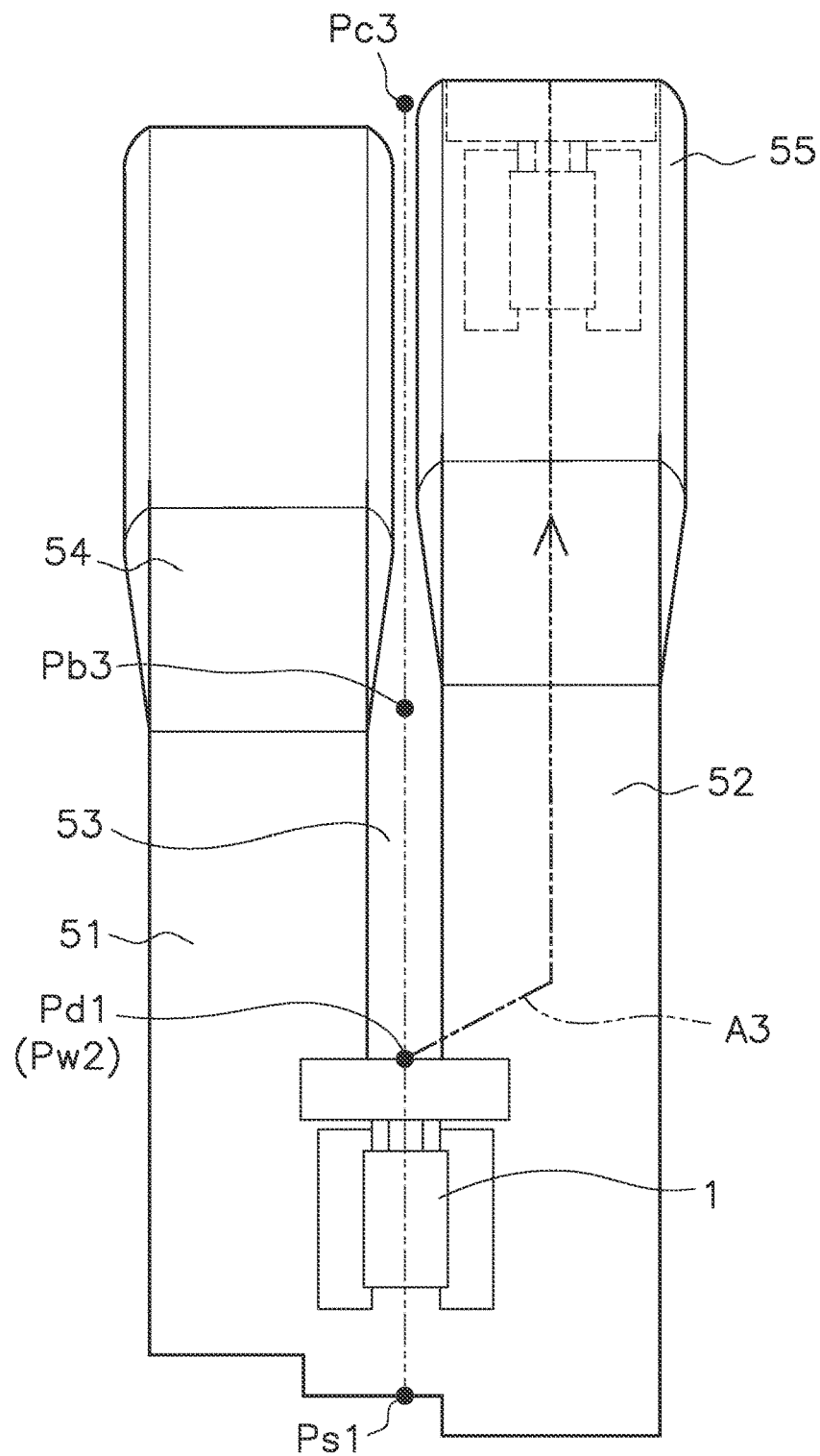
FIG. 17 illustrates motions of the work machine under the load reduction control according to a modified example.

In the above embodiment, the controller 26 reduces the load applied to the work implement 13 by raising the work implement 13 during the load reduction control. However, the controller 26 may reduce the load applied to the work implement 13 with another method. For example, when the load is equal to or greater than the first threshold Th1, the controller 26 may reduce the load by causing the work machine 1 to move to the adjacent first slot 51 or second slot 52 as indicated by the arrow A3 in FIG. 17.

Alternatively, the controller 26 may selectively execute the load reduction control by raising of the work implement 13 or by causing the work machine 1 to move to an adjacent slot. For example, FIG. 18 is a flow chart illustrating processing of load reduction control according to a modified example.

Figure 18:
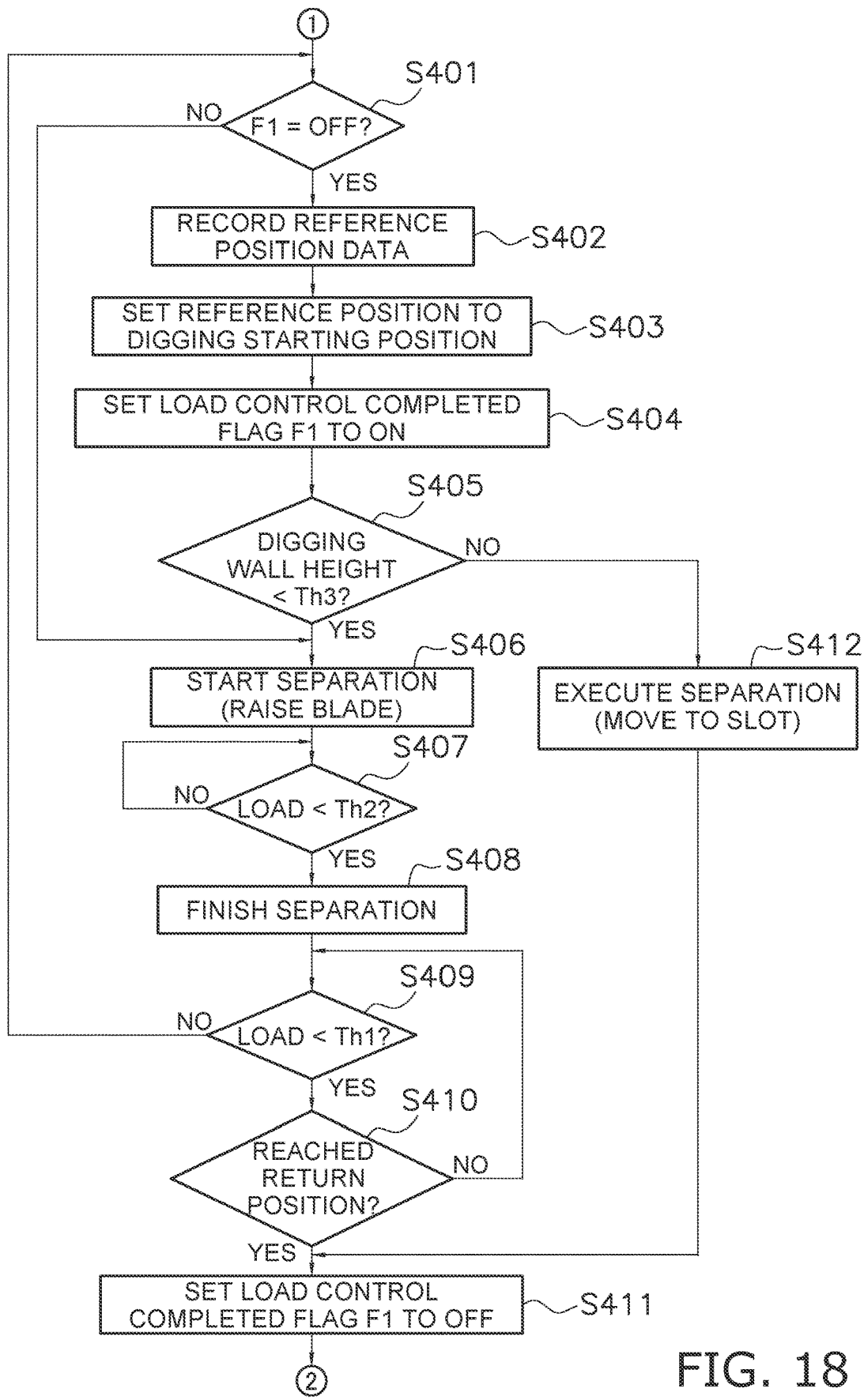
FIG. 18 is a flow chart illustrating processing of load reduction control according to a modified example.

In FIG. 18, steps S9.01 to S9.04 are the respectively same as the abovementioned steps S301 to S304 in FIG. 12. In step S9.05, the controller 26 determines whether the height of the digging wall 53 is less than a third threshold Th3. In this case, the height of the digging wall 53 is, for example, the vertical distance from the bottom surface of the adjacent slot to the top of the digging wall 53.

When the height of the digging wall 53 is less than the third threshold Th3, the processing advances to step S406. Steps S406 to S411 are the respectively same as the abovementioned steps S305 to S310 in FIG. 12. Therefore, when the height of the digging wall 53 is less than the third threshold Th3, the controller 26 reduces the load applied to the work implement 13 by raising the work implement 13. In step S405, when the height of the digging wall 53 is equal to or greater than the third threshold Th3, the processing advances to step S412 in FIG. 12.

In step S412, the controller 26 causes the work implement 13 to separate by causing the work machine 1 to move to the first slot 51 or the second slot 52 adjacent to the digging wall 53. Consequently, the load applied to the work implement 13 is reduced.

The controller 26 may determine which slot to cause the work machine 1 to move to in response to an operation of the input device 25b by the operator. Alternatively, the controller 26 may determine which slot to cause the work machine 1 to move to in response to the position of the first slot 51 and the second slot 52 or in response to a condition such as the presence of another vehicle.

After causing the work machine 1 to move to the first slot 51 or the second slot 52, the controller 26 causes the work machine 1 to move further forward within the slot and execute the soil piling. Thereafter, in step S411, the controller 26 sets the load control completed flag F1 to "OFF" The processing then returns to step S208. The subsequent processes are performed in the same way as indicated above.

According to the present invention, digging can be performed with a high quality finish by means of an automatic control of a work machine.

The invention claimed is:

1. A system for automatically controlling a work machine including a work implement, the system comprising:
a load sensor configured to detect load data indicative of a load applied to the work implement; and
a processor configured to acquire the load data; the processor being configured to
execute a load reduction control in order to cause the work machine to operate so as to reduce the load based on the load applied to the work implement during digging,
record, as a reference position, a position of the work machine when the load applied to the work implement during the digging becomes a predetermined threshold or greater,
determine a next starting position based on the reference position, and
control the work machine to start next digging from the next starting position.

2. The system according to claim 1, wherein
the processor is further configured to
acquire a first starting position of a first digging,
control the work machine to start the first digging with the work implement from the first starting position,
execute the load reduction control based on the load applied to the work implement during the first digging,
record, as the reference position, the position of the work machine when the load applied to the work implement during the first digging becomes the predetermined threshold or greater,
determine a second starting position based on the reference position, and
control the work machine to start second digging from the second starting position after the first digging is finished.

3. The system according to claim 1, wherein
the processor is further configured to
execute the load reduction control when the load applied to the work implement during the digging is the predetermined threshold or greater, and
record a position where the execution of the load reduction control starts as the reference position.

4. The system according to claim 1, wherein
when the processor executes the load reduction control a plurality of times during the digging, the processor is further configured to determine the next starting position based on the earliest position among positions of the work machine when the execution of the load reduction control is started the plurality of times.

5. The system according to claim 1, wherein
the processor is further configured to reduce the load by raising the work implement during the load reduction control.

6. The work machine according to claim 3, wherein
the processor is further configured to
selectively execute a normal digging mode in order to dig an actual topography at a work site, and a wall digging mode in order to dig a digging wall formed between a plurality of slots by the digging of the actual topography, and
during the wall digging mode, record the position of the work machine when the execution of the load reduction control starts, as the reference position, determine the next starting position based on the reference position, and control the work machine to start the next digging from the next starting position.

7. The system according to claim 6, wherein
when the load is a predetermined threshold or greater, the processor is further configured to reduce the load by causing the work machine to move to an adjacent slot.

8. The system according to claim 6, wherein
the processor is further configured to selectively execute the load reduction control by raising the work implement or by causing the work machine to move to an adjacent slot.

9. The system according to claim 8, wherein
the processor is further configured to
acquire digging wall data indicative of a height of the digging wall, and
determine to raise the work implement or cause the work machine to move to an adjacent slot based on the height of the digging wall during the load reduction control.

10. A method executed by a processor for automatically controlling a work machine including a work implement, the method comprising:
acquiring load data indicative of a load applied to the work implement;
executing a load reduction control in order to cause the work machine to operate so as to reduce the load based on the load applied to the work implement during digging;
recording, as a reference position, a position of the work machine when the load applied to the work implement during the digging becomes a predetermined threshold or greater;
determining a next starting position based on the reference position; and
controlling the work machine to start next digging from the next starting position.

11. The method according to claim 10, further comprising:
acquiring a first starting position of a first digging;
controlling the work machine to start the first digging with the work implement from the first starting position;
executing the load reduction control based on the load applied to the work implement during the first digging;
recording, as the reference position, the position of the work machine when the load applied to the work implement during digging becomes a predetermined threshold or greater;
determining a second starting position based on the reference position; and
controlling the work machine to start second digging from the second starting position after the first digging is finished.

12. The method according to claim 10, wherein
the load reduction control is executed when the load applied to the work implement during digging is the predetermined threshold or greater, and
a position where the execution of the load reduction control starts is recorded as the reference position.

13. The method according to claim 12, wherein
when the processor executes the load reduction control a plurality of timers during the digging, the determining the next starting position includes determining the next starting position based on the earliest position among positions of the work machine when the execution of the load reduction control is started the plurality of times.

14. The method according to claim 10, wherein
the load reduction control includes reducing the load by raising the work implement during the load reduction control.

15. The method according to claim 12, further comprising:
selectively executing a normal digging mode in order to dig an actual topography at a work site, and a wall digging mode in order to dig a digging wall formed between a plurality of slots by the digging of the actual topography,
the wall digging mode includes
recording the position where the execution of the load reduction control starts, as the reference position,
determining the next starting position based on the reference position, and
controlling the work machine to start second digging from the second starting position after the first digging is finished.

16. The method according to claim 15, wherein
when the load is a predetermined threshold or greater, the load reduction control includes reducing the load by causing the work machine to move to an adjacent slot.

17. The method according to claim 15, wherein
the load reduction control includes selectively executing raising the work implement or causing the work machine to move to an adjacent slot.

18. The method according to claim 17, further comprising:
acquiring digging wall data indicative of a height of the digging wall,
the load reduction control including determining to raise the work implement or cause the work machine to move to an adjacent slot based on the height of the digging wall during the load reduction control.

* * * * *